United States Patent
Nakai et al.

(10) Patent No.: US 8,420,276 B2
(45) Date of Patent: Apr. 16, 2013

(54) CATALYST LAYER AND PREPARATION PROCESS THEREOF, AND MEMBRANE-ELECTRODE ASSEMBLY AND POLYMER ELECTROLYTE FUEL CELL USING THE CATALYST LAYER

(75) Inventors: Shinji Nakai, Tsukuba (JP); Keiji Kubo, Tsukuba (JP); Hiroyuki Ohgi, Tsukuba (JP); Tomohiro Ono, Tsukuba (JP)

(73) Assignee: Kuraray Co., Ltd., Kurashiki-shi (JP)

( * ) Notice: Subject to any disclaimer, the term of this patent is extended or adjusted under 35 U.S.C. 154(b) by 837 days.

(21) Appl. No.: 12/526,276

(22) PCT Filed: Jan. 23, 2008

(86) PCT No.: PCT/JP2008/050859
§ 371 (c)(1),
(2), (4) Date: Aug. 7, 2009

(87) PCT Pub. No.: WO2008/096598
PCT Pub. Date: Aug. 14, 2008

(65) Prior Publication Data
US 2010/0323269 A1    Dec. 23, 2010

(30) Foreign Application Priority Data
Feb. 7, 2007    (JP) .................................. 2007-028230

(51) Int. Cl.
*H01M 4/60* (2006.01)

(52) U.S. Cl.
USPC ........... 429/484; 429/485; 502/159; 502/162; 502/168

(58) Field of Classification Search .................. 502/159, 502/162, 168; 429/484, 485
See application file for complete search history.

(56) References Cited

U.S. PATENT DOCUMENTS

| 5,677,074 A | 10/1997 | Serpico et al. |
| 2002/0192535 A1 | 12/2002 | Fukuda et al. |

FOREIGN PATENT DOCUMENTS

| EP | 1 515 381 A1 | 3/2005 |
| EP | 1 852 928 | 11/2007 |
| JP | 2-7398 | 2/1990 |
| JP | 3-208260 | 9/1991 |
| JP | 11-273695 | 10/1999 |
| JP | 2000-513484 | 10/2000 |
| JP | 2000-331693 | 11/2000 |
| JP | 2002-164055 | 6/2002 |
| JP | 2002-216777 | 8/2002 |
| JP | 2002-367626 | 12/2002 |
| JP | 2003 36857 | 2/2003 |
| JP | 2003-123771 | 4/2003 |
| JP | 2005-108827 | 4/2005 |
| JP | 2005 108827 | 4/2005 |
| JP | 2005-197178 | 7/2005 |
| JP | 2005 197178 | 7/2005 |
| JP | 2005 259513 | 9/2005 |
| JP | 2005-259513 | 9/2005 |
| JP | 2005 259646 | 9/2005 |
| JP | 2005-259646 | 9/2005 |
| JP | 2006 202737 | 8/2006 |
| WO | 2004/073090 A2 | 8/2004 |

OTHER PUBLICATIONS

U.S. Appl. No. 12/523,814, filed Jul. 20, 2009, Ohgi, et al.
O. Wollersheim—"Photonen-Korrelationsspektroskopie", Thieme Rompp Online, version 3.18, Jan. 1, 2011, 4 pages.
Office Action issued Jul. 25, 2011 in Chinese patent application No. 20080004458.7 (English translation included).
European Search Report issued Dec. 28, 2011 in European Patent Application No. 08703700.8.
Notification of Reasons for Refusal issued Oct. 26, 2012, in Japanese Application No. 2008-506086 (with English translation) and English translations of Tables in Documents.

*Primary Examiner* — Stuart Hendrickson
(74) *Attorney, Agent, or Firm* — Oblon, Spivak, McClelland, Maier & Neustadt, L.L.P.

(57) ABSTRACT

In a membrane-electrode assembly for polymer electrolyte fuel cells comprising a polymer electrolyte membrane and two gas diffusion electrodes being bonded to the membrane so that the membrane can be between them, at least one catalyst layer constituting the gas diffusion electrodes characterized in that the ion-conductive binder comprises a block copolymer having a particle size of 1 µm or less comprising a polymer block (A) having ion-conductive groups and a polymer block (B) having no ion-conductive group, both polymer blocks phase separate from each other, polymer block (A) forms a continuous phase, and the contact parts of the block copolymer with catalyst particles are comprised of polymer block (A) having ion-conductive groups; a membrane-electrode assembly and a polymer electrolyte fuel cell.

20 Claims, 9 Drawing Sheets

CATALYST LAYER AND PREPARATION PROCESS THEREOF, AND MEMBRANE-ELECTRODE ASSEMBLY AND POLYMER ELECTROLYTE FUEL CELL USING THE CATALYST LAYER

TECHNICAL FIELD

This invention relates to a catalyst layer and a preparation process thereof and a membrane-electrode assembly and a polymer electrolyte fuel cell using the catalyst layer.

BACKGROUND ART

In recent years, as a power generation system which is mild to the global environment and clean, fuel cells have drawn attention. Fuel cells are classified, depending on kinds of electrolytes, into a phosphoric acid type, a molten carbonate type, a solid oxide type, a polymer electrolyte type, etc. Among them, polymer electrolyte fuel cells are tried to be applied as power sources for electric vehicles, power sources for portable apparatuses, and, further, applied to domestic cogeneration systems utilizing electricity and heat at the same time, from the viewpoints of workability at low temperatures, miniaturization and lightening, etc.

A polymer electrolyte fuel cell is generally composed as follows. First, on both sides of a polymer electrolyte membrane having ion conductivity (the ion is usually proton), catalyst layers comprising a platinum group metal catalyst supported on carbon powder and an ion-conductive binder comprising a polymer electrolyte are formed, respectively. On the outsides of the catalyst layers, gas diffusion layers as porous materials through which fuel gas and oxidant gas can pass are formed, respectively. As the gas diffusion layers, carbon paper, carbon cloth, etc. are used. An integrated combination of the catalyst layer and the gas diffusion layer is called a gas diffusion electrode, and a structure wherein a pair of gas diffusion electrodes are bonded to the electrolyte membrane so that the catalyst layers can face to the electrolyte membrane, respectively, is called a membrane-electrode assembly (MEA). On both sides of the membrane-electrode assembly, separators having electric conductivity and gastightness are placed. Gas paths supplying the fuel gas or oxidant gas (e.g., air) onto the electrode surfaces are formed, respectively, at the contact parts of the membrane-electrode assembly and the separators or inside the separators. Power generation is started by supplying a fuel gas such as hydrogen or methanol to one electrode (fuel electrode) and an oxidant gas containing oxygen such as air to the other electrode (oxygen electrode). Namely, the fuel gas is ionized at the fuel electrode to form protons and electrons, the protons pass through the electrolyte membrane and transferred to the oxygen electrode, the electrons are transferred via an external circuit formed by connecting both electrodes into the oxygen electrode, and they react with the oxidant gas to form water. Thus, the chemical energy of the fuel gas is directly converted into electric energy which can be taken out.

Further, in addition to such proton exchange-type fuel cells, anion exchange-type fuel cells using an anion-conductive membrane and an anion-conducting binder (the anions are usually hydroxide ions) are also studied. The constitution of a polymer electrolyte fuel cell in this case is basically the same as in the proton exchange-type fuel cell except that an anion-conductive membrane and an anion-conductive binder are used in place of the proton-conducting membrane and the proton-conducting binder, respectively. As to the mechanism of generation of electric energy, oxygen, water and electrons react at the oxygen electrode to form hydroxide ions, the hydroxide ions pass through the anion-conductive membrane and react with hydrogen at the fuel electrode to form water and electrons, and the electrons are transferred via an external circuit formed by connecting both electrodes into the oxygen electrode and react again with oxygen and water to form hydroxide ions. Thus, the chemical energy of the fuel gas is directly converted into electric energy which can be taken out.

The above electrode reactions take place at three-phase interfaces formed by a gaseous phase as a supplying path of the fuel gas or oxidant gas, a liquid phase as an ion path and a solid phase as an electron path. The ion-conductive binder is used for the purpose of binding the catalyst and heightening the utilization efficiency of the catalyst by mediating the transfer of protons or hydroxide ions from the catalyst layer to the electrolyte membrane. Therefore, catalyst particles not contacting with the ion path formed by the ion-conductive binder cannot take part in the formation of the three-phase boundary, and it is hard for such particles to contribute to the reaction. Further, in order to obtain high efficiency, the minute structural design of the catalyst layer including pore structure for diffusing fuel gas or oxidant gas, the dispersion state of the catalyst, etc. becomes important. Further, at the gas diffusion electrode parts, there arises a case wherein the catalyst surface is covered with water contained in the reaction gases or water formed at the oxygen electrode or the fuel electrode, and the fuel gas or the oxidant gas cannot contact with the catalyst surface, and as a result, power generation is stopped, or a case wherein such water prevents the fuel gas or oxidant gas from being supplied or discharged to stop the electrode reaction. Therefore, the water repellency of the gas diffusion electrode part is required.

As to bonding of the gas diffusion electrode and the electrolyte membrane, a method wherein the bonding is carried out by hot press is known. Further, a method is known wherein, in order to obtain good bonding strength and good electric bonding state, an ion-conductive binder is applied as an adhesive resin between the gas diffusion electrode and the electrolyte membrane to enhance adhesion. In such application, the ion-conductive binder is used generally in a solution sate.

In order to form three-phase interfaces acting as electrode reaction sites, in proton-exchange-type fuel cells, Nafion (registered trademark of Dupont Co., which is the same hereinafter), which is a perfluorocarbonsulfonic acid polymer as described in Patent Document 1 and Patent Document 2, is generally used from the reason of being chemically stable, as the ion-conducting binder (cation-conducting binder). However, Nafion has a hydrophobic main chain having no sulfonic acid group, and it is supposed that the catalyst covered with the hydrophobic part in the catalyst layer cannot form a three-phase interface and cannot contribute to electrode reaction. If the content of sulfonic acid groups is increased for increasing the number of the three-phase interface and increasing catalyst utilization proportion, there is an apprehension that the hydrophilicity of the polymer is heightened, the binder itself is gradually eluted out of the cell system by moisture contained in reaction gases, water formed in the oxygen electrode, etc. during power generation, and deterioration of the electrodes advances to make ensuring of sufficient operation time impossible. If the Nafion content is increased for increasing the content of sulfonic acid groups in the catalyst layer, there is an apprehension that Nafion blocks the diffusion paths of reactants necessary for formation of the three-phase interfaces to lower the efficiency of electrode reaction.

In order to increase three-phase interfaces, an electrode consisting of electrically conductive particles supporting a catalyst thereon and electrolyte particles having proton conductivity is proposed (Patent Document 3). Such an electrode is advantageous for forming diffusion paths of reactant gases, but since the particle size of the resulting particles is as very large as 3 to 20 µm, it is difficult to design minute electrode catalyst layers for increasing three-phase interfaces. Furthermore, since the matrix polymer is used as the electrolyte particles, it is impossible to heighten the ionic group density of electrolyte particle surfaces and it is difficult to form ion paths necessary for formation of three-phase interfaces.

As materials for ion-conductive binders, besides fluorine-containing electrolytes, aromatic engineering plastic resins in which ion-conductive groups such as sulfonic acid groups are introduced is studied. Besides aromatic engineering plastic resins, cation-conductive binders comprising styrene type thermoplastic elastomers have been proposed (Patent Document 4 and Patent Document 5). For example, sulfonated SEBS (SEBS is an abbreviation of polystyrene-poly(ethylene-butylene)-polystyrene tri-block copolymer) is proposed, and it is disclosed that it is sparingly soluble in water, and has good bonding strength with an electrolyte membrane. However, ion-conductive binders comprising the above-mentioned aromatic engineering plastic resin or styrene type thermoplastic elastomer also have the same problems as fluorine-containing ion-conductive binders.

Further, resins are studied which have a high ionic group content and are made to be insoluble in water by introducing cross-linking groups, but the resins are insoluble in organic solvents and need to be used as a suspension in a suitable solvent, and moreover, are poor in dispersibility into the catalyst layer and thus it is difficult to form effective three-phase interfaces.

On the other hand, as anion-conductive binders used in anion exchange-type fuel cells, one wherein the sulfonic acid groups of perfluorosulfonic acid-type polymers are converted to anion exchange groups is known. For example, one obtained by copolymerizing tetrafluoroethylene with $CF_2=CFOCF_2CF(CF_3)O(CF_2)_2SO_3F$ and then making N,N,N'-trimethylethylenediamine act thereon is disclosed in Patent Document 6. As another anion-conductive binder, an anion exchange resin obtained by chroromethylating a copolymer of an aromatic polyethersulfone with an aromatic polythioethersulfone and then aminating the resulting compound is disclosed in Patent Document 7. As still another anion-conductive binder, an anion-conductive binder obtained by introducing a quaternary ammonium group into a polystyrene-poly(ethylene-butylene)-polystyrene tri-block copolymer or the like is disclosed in Patent Document 8. However, the above-mentioned anion-conductive binders also have the same defects as the cation-conductive binders have.

As mentioned above, it is the actual situation that a catalyst layer which is excellent in formation of three-phase interfaces acting as electrode reaction sites, and, at the same time, does not block diffusion paths of reactants.

Patent Document 1: JP 2-7398 B
Patent Document 2: JP 3-208260 A
Patent Document 3: JP 2003-123771 A
Patent Document 4: JP 2002-164055 A
Patent Document 5: JP 2000-513484 A
Patent Document 6: JP 2000-331693 A
Patent Document 7: JP 11-273695 A
Patent Document 8: JP 2002-367626 A

DISCLOSURE OF INVENTION

Problems to be Solved by the Invention

The object of this invention is to provide a catalyst layer which is economical, is environment-friendly, has good moldability and is excellent in electrode reaction efficiency and a preparation process thereof, and a membrane-electrode assembly and a polymer electrolyte fuel cell in both of which the catalyst layer is used.

Means for Solving the Problems

The present invention solving the above problems relates to in a membrane-electrode assembly for polymer electrolyte fuel cells comprising a polymer electrolyte membrane and two gas diffusion electrodes being bonded to the membrane so that the membrane can be between them, in which assembly each gas diffusion electrode is comprised or composed of a catalyst layer and a gas diffusion layer and each catalyst layer is mainly composed of catalyst particles and an ion-conductive binder, a catalyst layer usable as at least one of the catalyst layers characterized in that the ion-conductive binder mainly comprises a block copolymer having a particle size of 1 µm or less comprising a polymer block (A) having ion-conductive groups and a polymer block (B) having no ion-conductive group, both polymer blocks phase separate from each other, polymer block (A) forms a continuous phase, and the contact parts of the block copolymer with the catalyst particles are comprised or composed of polymer block (A) having ion-conductive groups.

The catalyst layer of the invention is excellent in reaction efficiency. In the catalyst layer having such a structure, it is possible to ensure ion paths necessary for formation of three-phase interfaces functioning as electrode reaction sites since polymer block (A) having ion-conductive groups of the block copolymer forms a continuous phase, and it is also possible to form three-phase interfaces efficiently since the contact parts between the catalyst particles and the block copolymer are composed of phases having ion-conductive groups. Moreover, since the ion-conductive binder contains polymer block (B) having no ion-conductive group, water resistance of the catalyst layer is heightened, and it is possible to prevent the electrodes from being deteriorated through gradual elution of the ion-conductive binder itself out of the cell system by moisture contained in the reactant gases, water formed at the oxygen electrode, etc. during power generation.

In the block copolymer, it is preferred that the repeating unit constituting polymer block (A) is an aromatic vinyl compound unit.

It is also preferred that polymer block (B) is a rubber-like polymer block (B1). By a thing that the rubber-like polymer block is flexible structure, the block copolymer takes on elasticity and becomes flexible as a whole, and in preparation of membrane-electrode assemblies and polymer electrolyte fuel cells, moldability (assembling properties, bonding properties, fastening properties, etc.) is improved.

It is also preferred that polymer block (B) comprises polymer block (B1), and a structure-holding polymer block (B2) which phase separates from polymer block (A) and polymer block (B1). By adding polymer block (B2), it is possible to reduce the possibility of structural destruction of the membrane-electrode assembly and/or destruction of the phase separation structure.

It is possible to use any of cation-conductive groups and anion-conductive groups as the ion-conductive group, but a cation-conductive group selected from a sulfonic acid group and a phosphonic acid group and alkali metal salts and ammonium salts of them is preferred, and a cation-conductive group selected from a sulfonic acid group and alkali metal salts and ammonium salts thereof is further preferred.

Such a catalyst layer excellent in electrode reaction efficiency can be prepared by mixing a dispersion wherein the block copolymer and optional additive(s) are dispersed in an aqueous dispersion medium so that the particle size of the copolymer can be 1 µm or less, with catalyst particles and an optional water repellent, and removing the aqueous dispersion medium. By adjusting the particle size of the copolymer to 1 µm or less, it is possible to enlarge the contact area of the copolymer with the catalyst particles in the catalyst layer of the same thickness as that of usual catalyst layers, and, namely, it is possible to increase three-phase interfaces. Even if the particle size of the copolymer is more than it is possible to heighten the content of the copolymer in the catalyst layer for the purpose of increasing three-phase interfaces, but, since diffusion of the reactants such as the fuel and air is hindered by increase of the thickness of the catalyst layer, it is impossible to enhance electrode reaction efficiency. By using an aqueous dispersion medium, namely water or a solvent mainly comprising water, the copolymer is oriented so that polymer block (B) having no ion-conductive group can be an inner layer and polymer block (A) having ion-conductive groups can be an outer layer, and, as a result, the contact parts of the block copolymer with the catalyst particles come to be comprised or composed of polymer block (A) having ion-conductive groups.

The invention also relates to a membrane-electrode assembly using the catalyst layer and a fuel cell using the membrane-electrode assembly.

Effect of the Invention

The catalyst layer, membrane-electrode assembly and polymer electrolyte fuel cell of the invention are economical, environment-friendly and excellent in electrode reaction efficiency, and are useful for improvement of cell efficiency or reduce of use amount of noble metal catalysts used in cells.

BEST MODE FOR CARRYING OUT THE INVENTION

The invention is described in detail below. FIG. 1 is a schematic view showing the structure of the catalyst layer of an electrode for fuel cells of the invention. As shown in the view, the catalyst layer mainly comprises catalyst particles and the block copolymer, the block copolymer phase separate into polymer block (A) having ion-conductive groups and polymer block (B) having no ion-conductive group, polymer block (A) having ion-conductive groups forms a continuous phase, and the contact parts of the block copolymer with the catalyst particles are comprised or composed of polymer block (A) having ion-conductive groups.

As to the constitutive materials of the catalyst particles, there is no particular restriction, and there can be used catalyst metal fine particles such as platinum black, and particles supporting a catalyst thereon can be used wherein a catalyst metal is supported on an electrically conductive material. As the catalyst metal, any metal can be used so long as it is a metal capable of promoting oxidation reaction of a fuel such as hydrogen or methanol and reduction reaction of oxygen, and there can, for example, be mentioned platinum, gold, silver, palladium, iridium, rhodium, ruthenium, iron, cobalt, nickel, chromium, tungsten, manganese, etc., and their alloys such as a platinum-ruthenium alloy. Among them, platinum or a platinum alloy is used in many cases. The particle size of a metal as the catalyst is, usually, 10 to 300 angstroms. As support materials, any electrically conductive materials can be used, and there can, for example, be mentioned carbon materials. As carbon materials, there can, for example, be mentioned carbon blacks such as furnace black, channel black and acetylene black, activated carbon, graphite, etc. These can be used alone or as a mixture of two or more.

The block copolymer used in the invention is such a copolymer that it comprises polymer block (A) having ion-conductive groups and polymer block (B) having no ion-conductive group, and both blocks mutually phase separate. As an example of such copolymer, there can be used copolymers mentioned in WO 2006/068279 A1. The block copolymer used in the invention is described in detail below.

As monomers capable of forming the repeating unit of polymer block (A), there is no particular restriction, and there can, for example, be mentioned aromatic vinyl compounds, conjugated dienes having 4 to 8 carbon atoms (1,3-butadiene, isoprene, etc.), alkenes having 2 to 8 carbon atoms (ethylene, propylene, isobutylene, etc.), (meth)acrylic esters (methyl (meth)acrylate, ethyl (meth)acrylate, butyl (meth)acrylate, etc.), vinyl esters (vinyl acetate, vinyl propionate, vinyl butyrate, vinyl pivalate, etc.); vinyl ethers (methyl vinyl ether, isobutyl vinyl ether, etc.), etc., but, in view of easiness of introduction of an ion-conductive group, aromatic vinyl compounds are preferred. As examples of aromatic vinyl compounds, styrene, α-methylstyrene, styrene wherein hydrogen atom(s) bonded to the benzene ring is/are replaced with 1 to 3 alkyl groups each having 1 to 4 carbon atoms (methyl groups, ethyl groups, n-propyl groups, isopropyl groups, n-butyl groups, isobutyl groups, tert-butyl groups, etc.) (p-methylstyrene, etc.), vinylnaphthalene, vinylanthracene, vinylpyrene, vinylpyridine and so on. It is preferred in view of easiness of introduction of an ion-conductive group that the aromatic vinyl compound unit is a styrene unit and/or an α-methylstyrene unit. It is also preferred in view of heightening stability against oxidation by hydrogen peroxide formed in side reaction of electrode reaction and/or hydroxyl radicals derived from hydrogen peroxide that the aromatic vinyl compound unit has a structure having no tertiary carbon, and, specifically, is an α-methylstyrene unit.

When the repeating unit of polymer block (A) is an aromatic vinyl compound unit, polymer block (A) can contain one or plural other monomer units. As such other monomer units, there can, for example, be mentioned conjugated diene units each having 4 to 8 carbon atoms (1,3-butadiene unit, isoprene unit, etc.), (meth)acrylic ester units (methyl (meth)acrylate unit, ethyl (meth)acrylate unit, butyl (meth)acrylate unit, etc.), alkene units each having 2 to 8 carbon atoms (ethylene unit, propylene unit, isobutene unit, etc.), etc. In the above, the conjugated diene unit is preferably one wherein its 30% by mol or more is hydrogenated, more preferably one wherein its 50% by mol or more is hydrogenated and still more preferably one wherein its 80% by mol or more is hydrogenated. In view of giving the ion-conductive binder sufficient oxidation stability, the proportion of the aromatic vinyl compound unit in polymer block (A) is preferably 80% by mass or more and more preferably 90% by mass or more. The form of the copolymerization of the aromatic vinyl compound with the other monomer needs to be random copolymerization.

The molecular weight of polymer block (A) in such a state that no ion-conductive group is introduced is appropriately chosen depending on the nature and state, desired performance, other polymer components, etc. of the ion-conductive binder. When the molecular weight is large, there is a tendency that, due to rise of viscosity, it becomes difficult to obtain an aqueous dispersion of the block copolymer having a uniform average particle size, and, when the molecular weight is small, there is a tendency that the amount of ion-conductive groups which can be introduced into the ion-conductive binder is restricted, and, therefore, it is important to appropriately choose the molecular weight in accordance with necessary performance. Usually, the molecular weight is preferably chosen between 100 and 1,000,000, and more preferably chosen between 1,000 and 100,000, as number average molecular weight in terms of polystyrene.

The block copolymer has, besides polymer block (A), polymer block (B) having no ion-conductive group. If an ion-conductive group is introduced into polymer block (A) in a high content, water resistance is heightened by having polymer block (B), and it is possible to prevent the ion-conductive binder from flowing out during power generation. Polymer block (B) is not particularly restricted so long as it phase separates from polymer block (A) and has water resistance, but it is preferred that polymer block (B) is a rubber-like polymer block (B1). By that the rubber-like polymer block has flexible structure, the block copolymer takes on elasticity and becomes flexible as a whole, and in preparation of membrane-electrode assemblies and polymer electrolyte fuel cells, moldability (assembling properties, bonding properties, fastening properties, etc.) is improved. Such flexible polymer block (B1) is a so-called rubberlike polymer block whose glass transition point or softening point is 50° C. or less, preferably 20° C. or less, more preferably 10° C. or less.

As the repeating unit constituting polymer block (B1), there can be mentioned conjugated diene units each having 4 to 8 carbon atoms (1,3-butadiene unit, isoprene unit, etc.), alkene units each having 2 to 8 carbon atoms (isobutylene unit, etc.), etc. Monomers giving these units can be used alone or in a combination of two or more. When two or more are copolymerized, the form thereof can be random copolymerization, block copolymerization, graft copolymerization or tapered copolymerization. When a monomer used in the (co)polymerization has two carbon-carbon double bonds, any of them can be used in the polymerization, and in the case of a conjugated diene either of 1,2-bond and 1,4-bond can be used in the polymerization, and so long as the glass transition point or softening point is 50° C. or less, there is no particular restriction on the proportion between 1,2-bond and 1,4-bond.

When the repeating units constituting polymer block (B1) have a carbon-carbon double bond as in conjugated diene units, it is preferred that 30% by mol or more of the carbon-carbon double bonds are hydrogenated, it is further preferred that 50% by mol or more thereof are hydrogenated, and it is still further preferred that 80% by mol or more thereof are hydrogenated, in view of enhancement of the power generation performance, heat deterioration resistance, etc. of membrane-electrode assemblies using the ion-conductive binder of the invention. The hydrogenation proportion of the carbon-carbon double bonds can be calculated according to a method generally used, for example, a method of measuring iodine value, $^1$H-NMR measurement, or the like.

Polymer block (B1) can contain, besides the above monomer unit(s), another monomer unit, for example a unit of an aromatic vinyl compound such as styrene or vinylnaphthalene or a halogen-containing vinyl compound such as vinyl chloride, so long as it does not spoil the purposes of polymer block (B1) of giving elasticity to the block copolymer. In this case, the form of the copolymerization of the above monomer with another monomer needs to be random copolymerization. The proportion of the conjugated diene unit or alkene unit in polymer block (B1) is preferably 50% by mass or more, more preferably 70% by mass or more, still more preferably 90% by mass or more, based on the total of the above monomer unit and another monomer unit.

The meaning of the expression that polymer block (B1) having no ion-conductive group is that it substantially has no ion-conductive group, and, if a trace amount of ion-conductive groups are incorporated into polymer block (B1) in the course of preparation of the block copolymer, it is within the invention. This applies to polymer block (B2) described later.

The mass ratio of polymer block (A) to polymer block (B1) in the copolymer is not particularly restricted, and is preferably 95:5 to 5:95, more preferably 90:10 to 10:90 and still more preferably 50:50 to 10:90. The arrangement of polymer block (A) and polymer block (B1) in the block copolymer is not particularly restricted, and the block copolymer can be an A-B1 diblock copolymer, an A-B1-A triblock copolymer, a B1-A-B1 triblock copolymer, an A-B1-A-B1 tetrablock copolymer, an A-B1-A-B1-A pentablock copolymer, a B1-A-B1-A-B1 pentablock copolymer, etc. These block copolymers can be used alone or in a combination of two or more.

The block copolymer used in the invention can contain, besides polymer block (A) and polymer block (B1), a structure-holding polymer block (B2) as another polymer block (B) which is different from polymer block (A) and polymer block (B1), phase separates from these blocks and has no ion-conductive group. Namely, polymer block (B) can comprise polymer block (B1) or comprise polymer block (B1) and polymer block (B2). As a repeating unit constituting polymer block (B2), there can be mentioned as a specific example an aromatic vinyl compound unit mentioned in the description of polymer block (A). Among such aromatic vinyl compound units constituting polymer block (B2), preferred is an aromatic vinyl compound unit into which an ion-conductive group is hard to introduce compared to the aromatic vinyl compound unit in polymer block (A), and, for example, when the aromatic vinyl compound unit(s) in polymer block (A) is/are a styrene unit and/or an α-methylstyrene unit, it is preferred that the aromatic vinyl compound unit constituting polymer block (B2) is a styrene unit wherein the hydrogen atom(s) bonded to the benzene ring is/are replaced with 1 to 3 alkyl groups having 1 to 4 carbon atoms (e.g., t-butylstyrene unit).

When polymer block (B2) is used, swelling of the ion-conductive binder is inhibited, it is possible to reduce blockage of diffusion of reactants due to swelling of the ion-conductive binder during power generation, and it is also possible to reduce a possibility that the structure of the membrane-electrode assembly is destroyed by swelling of the ion-conductive binder during power generation. Furthermore, in a step of forming a catalyst layer by removing the aqueous dispersion medium from a mixture of catalyst particles with an aqueous dispersion wherein the block copolymer is dispersed, a possibility that the phase separation structure of the ion-conductive binder which has been formed in the dispersion is destroyed can be reduced by polymer block (B2).

When the block copolymer comprises polymer block (A), polymer block (B1) and polymer block (B2), the arrangement of these polymer blocks is not particularly restricted, and the block copolymer can be an A-B1-B2 triblock copolymer, an A-B1-B2-A tetrablock copolymer, an A-B1-A-B2 tetrablock copolymer, a B1-A-B1-B2 tetrablock copolymer, an A-B1-B2-B1 tetrablock copolymer, a B2-B1-B2-A tetrablock copolymer, an B2-A-B1-A-B2 pentablock copolymer, a B2-B1-A-B1-B2 pentablock copolymer, an A-B2-B1-B2-A pentablock copolymer, an A-B1-B2-B1-A pentablock copolymer, an A-B2-B1-A-B2 pentablock copolymer, an A-B1-B2-A-B1 pentablock copolymer, an A-B1-B2-A-B2 pentablock copolymer, an A-B1-B2-B1-B2 pentablock copolymer, an A-B1-A-B2-B1 pentablock copolymer, a B1-A-B1-A-B2 pentablock copolymer, a B1-A-B1-B2-A pentablock copolymer, a B1-A-B1-B2-B1 pentablock copolymer, a B2-A-B2-B1-B2 pentablock copolymer, etc. Among them are preferred such arrangements that there is/are polymer block(s) (A) at the end(s) and shell phases are easy to form, and particularly preferred is an arrangement wherein rubber-like polymer block (B1) is arranged at the center, polymer blocks (B2) are arranged adjacently to both sides thereof and polymer blocks (A) are arranged adjacently to both outsides of polymer block (B2), for example A-B2-B1-B2-A or the like.

When the block copolymer used in the invention contains polymer block (B2), the proportion of polymer block (B2) in the block copolymer is preferably less than 75% by mass, more preferably less than 70% by mass and still more preferably less than 60% by mass.

The number average molecular weight of the block copolymer used in the invention, in a state that ion-conductive groups are not introduced, is not particularly restricted, but, usually, is preferably 10,000 to 2,000,000, more preferably 15,000 to 1,000,000 and still more preferably 20,000 to 500,000 as number average molecular weight in terms of polystyrene.

The block copolymer used in the invention has ion-conductive groups on polymer block (A). When ion conductivity is referred to in the invention, the ion includes a cation and an anion, and the cation includes a proton, etc. and the anion includes a hydroxide ion, etc. As the ion-conductive group, either of a cation-conductive group and an anion-conductive group can be used, but the cation-conductive group is preferably used. The cation-conductive group is not particularly restricted so long as it is such a group that a membrane-electrode assembly produced using the ion-conductive binder can display sufficient ion conductivity, but a sulfonic acid group or a phosphonic acid group or their salts represented by —SO₃M or —PO₃HM wherein M represents a hydrogen atom, an ammonium ion or an alkali metal ion, can be used preferably. In the above, as the alkali metal ion, there can be used a sodium ion, a potassium ion, a lithium ion, etc. As the cation-conductive group, a carboxyl group or a salt thereof can also be used. The anion-conductive group is not particularly restricted so long as it is such a group that a membrane-electrode assembly produced using the ion-conductive binder can display sufficient anion conductivity, and there can be used groups as shown below.

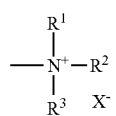
(1)

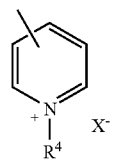
(2)

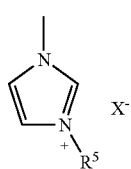
(3)

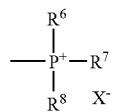
(4)

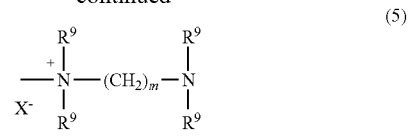
(5)

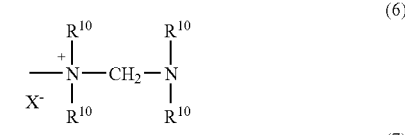
(6)

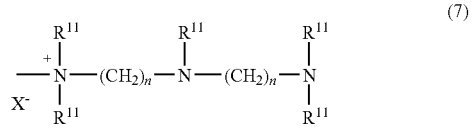
(7)

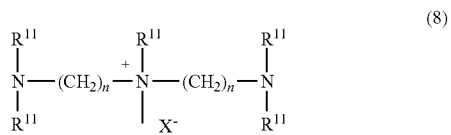
(8)

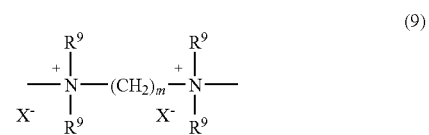
(9)

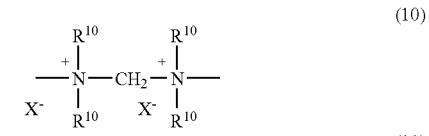
(10)

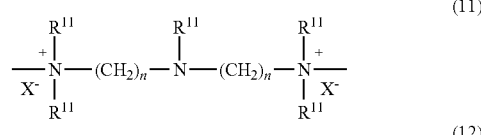
(11)

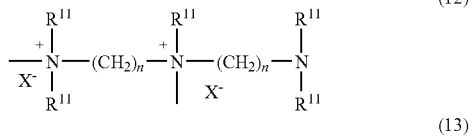
(12)

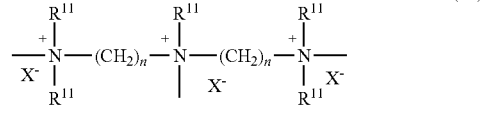
(13)

In the above formulae, $R^1$ to $R^3$ represent respectively independently hydrogen atoms or alkyl groups having 1 to 8 carbon atoms, $R^4$ to $R^9$ and $R^{11}$ represent respectively independently hydrogen atoms, methyl groups or ethyl groups, $R^{10}$ represents a methyl group or an ethyl group, $X^-$ represents a hydroxide ion or an acid anion, m represents an integer of 2 to 6, and n represents 2 or 3.

In the above formulae, polyvalent groups bond polymer blocks (A) themselves among block copolymers or inside the block copolymer.

The ion-conductive groups preferably exist at the side chains or free ends of the aromatic vinyl polymer block (A).

The amount of ion-conductive groups introduced is appropriately selected depending on performances needed for the block copolymer obtained and the like, but, in order to display sufficient ion conductivity to use the block copolymer as an ion-conductive binder for polymer electrolyte fuel cells, the amount of ion-conductive groups introduced is usually such an amount that the ion exchange capacity of the block copolymer is preferably 0.30 meq/g or more, and more preferably 0.40 meq/g or more. As to the upper limit of the ion exchange capacity of the block copolymer, there is no particular restriction, but, usually, it is preferred that the ion exchange capacity is 3 meq/g or less.

In order to enlarge contact area between particles of the block copolymer used in the invention and catalyst particles in the catalyst, the particle size of the block copolymer needs to be 1 μm or less, is preferably 0.5 μm or less and is more preferably 0.1 μm or less. When the particle size is 1 μm or less, cell reaction efficiency is improved and it is possible to improve cell output, compared to the case wherein it is more than 1 μm. There is no particular restriction on the lower limit of the particle size of the block copolymer, but, in view of adjusting it to a particle size necessary for it that the block copolymer phase separates into phases having ion-conductive groups and phases having no ion-conductive group, the particle size is preferably 10 nm or more and more preferably 40 nm or more.

The block copolymer used in the invention can be prepared by or according to the preparation process described in WO 2006/068279 A1 mentioned previously In the catalyst layer of the invention, the contact parts of the block copolymer with the catalyst particles are comprised or composed of polymer block (A), and, in order to give such a structure, it is preferred that the block copolymer take such a core-shell structure that the inner layer is polymer block (B) and the outer layer is polymer block (A). By taking the core-shell structure, polymer block (A) having ion-conductive groups can form a continuous phase efficiently. Moreover, since it is possible to gather ion-conductive groups at high density on the surface of the block copolymer which surface contacts with the catalyst particles, it is advantageous for formation of three-phase interfaces functioning as electrode reaction sites. Furthermore, since the catalyst particles are not completely covered with the ion-conductive binder by it that 1 to 90% of the space among the catalyst particles is left alone as voids, it is possible to secure sufficient diffusion paths for reactants (hydrogen gas, methanol, oxygen, etc.) and the catalyst layer of the invention is excellent in utilization efficiency of fuels and oxygen.

The ion-conductive binder used in the invention mainly comprises the block copolymer.

The ion-conductive binder used in the invention can contain, under such a condition that the effects of the invention are not spoiled, various additives, for example, softening agents, stabilizers, light stabilizers, antistatic agents, mold release agents, flame retardants, foaming agents, pigments, dyes, brighteners, carbon fiber, inorganic fillers, etc., alone respectively or in a combination of two or more.

As the softening agent, there can be mentioned petroleum softening agents such as paraffin-, naphthene- or aroma-process oils; paraffins; vegetable oil softening agents; plasticizers; etc., The stabilizers include phenol-type stabilizers, sulfur-type stabilizers, phosphorus-type stabilizers, and, as specific examples, there can be mentioned phenol-type stabilizers such as 2,6-di-t-butyl-p-cresol, pentaerythrityl tetrakis [3-(3,5-di-t-butyl-4-hydroxyphenyl)propionate], 1,3,5-trimethyl-2,4,6-tris(3,5-di-t-butyl-4-hydroxybenzypbenzene, octadecyl-3-(3,5-di-t-butyl-4-hydroxyphenyl)propionate, triethylene glycol bis[3-(3-t-butyl-5-methyl-4-hydroxyphenyl)propionate], 2,4-bis(n-octylthio)-6-(4-hydroxy-3,5-di-t-butylanilino)-1,3,5-triazine, 2,2-thio-diethylene bis[3-(3,5-di-t-butyl-4-hydroxyphenyl)propionate], N,N'-hexamethylenebis(3,5-di-t-butyl-4-hydroxy-hydrocinnamide), 3,5-di-t-butyl-4-hydroxy-benzylphosphonate diethyl ester, tris-(3,5-di-t-butyl-4-hydroxybenzyl)isocyanurate and 3,9-bis{2-[3-(3-t-butyl-4-hydroxy-5-methylphenyl)propionyloxy]-1,1-dimethylethyl}-2,4,8,10-tetraoxaspiro[5,5]undecane; sulfur-type stabilizers such as pentaerythrityl tetrakis(3-laurylthiopropionate), distearyl 3,3'-thiodipropionate, dilauryl 3,3'-thiodipropionate and dismyristyl 3,3'-thiodipropionate; phosphorus-type stabilizers such as tris(nonylphenyl)phosphite, tris(2,4-di-t-butylphenyl)phosphite, distearyl pentaerythritol diphosphite, bis(2,6-di-t-butyl-4-methylphenyl)pentaerythritol diphosphite; etc. These stabilizers can be used alone respectively or in a combination of two or more. As specific examples of the inorganic fillers, there can be mentioned talc, calcium carbonate, silica, glass fiber, mica, kaolin, titanium oxide, montmorillonite, alumina, etc.

As to the addition time of various optional additives as mentioned above which can be incorporated into the ion-conductive binder, it is possible to previously mix the block copolymer and the additives, it is also possible to add the additives when a dispersion of the block copolymer in a dispersion medium mainly comprising water is prepared, or it is further possible to add the additives when the dispersion is mixed with the catalyst.

The content of the block copolymer in the ion-conductive binder used in the invention is preferably 50% by mass or more, more preferably 70% by mass or more and furthermore preferably 90% by mass or more, in view of ion conductivity.

The catalyst layer of the invention mainly comprises catalyst particles and the ion-conductive binder described above, but can contain additives if necessary. As additives, water repellents can be exemplified. As water repellents, there can, for example, be mentioned various thermoplastic resins such as polytetrafluoroethylenes, polyvinylidene fluorides, styrene-butadiene copolymers and polyether ether ketones. Usually, an additive as a water repellent can be added when the block copolymer and the catalyst are mixed.

The total proportion of the catalyst particles and the ion-conductive binder in the catalyst layer of the invention is preferably 90% by mass or more and more preferably 95% by mass or more in view of securing contact area between the catalyst particles and the ion-conductive binder and obtaining high electrode reaction efficiency.

In the catalyst layer of the invention, the contact parts between the block copolymer and the catalyst particles are comprised or composed of polymer block (A) having ion-conductive groups, and, in order to realize such a structure, it is preferred to make the block copolymer take such a form that polymer block (B) having no ion-conductive group is oriented toward the inside and polymer block (A) is oriented toward the outside (namely, core-shell structure). Methods of inducing such a form are not particularly restricted. As an example, there can be mentioned (1) a method of mixing a dispersion of the block copolymer and optional additives in an aqueous dispersion medium with catalyst particles and an optional water repellent, and removing the aqueous dispersion medium from the mixture; or the like. As the dispersion in this method, an emulsion or a suspension is preferred, and the emulsion is further preferred.

As already mentioned, although in the catalyst layer of the invention, the ion-conductive binder, etc. exist in the space among the catalyst particles, part of the space, preferably 1 to 90% thereof is left as such, i.e. as voids, and functions as paths of reactants. As means to adjust the void as mentioned above, there can be mentioned a process of adjusting the concentration of the block copolymer in the dispersion in the method of the above-mentioned (1); a process which comprises adding a pore-forming agent to a mixture of the dispersion and the catalyst particles, casting the resulting mixture and then removing the pore-forming agent; etc. As the pore-forming agent, there can be used metals such as zinc, aluminum, chromium, cobalt, copper, iron, lead, nickel, magnesium and calcium; alloys or compounds each containing at least one of these metals; fibers composed of a water soluble polymer such as polyvinyl alcohol; etc. Among the above processes, it is the adjustment of the concentration that gives the largest influence on porosity, and spaces formed by evaporation of the aqueous dispersion medium remain as voids. The porosity of the catalyst layer can be determined by taking photographs of the catalyst layer by a transmission electron microscope (TEM) and calculating the proportion of area occupied by the voids in the catalyst layer.

In order to enlarge contact area between the block copolymer and the catalyst particles in the catalyst layer, the particle size of the block copolymer in the dispersion in the method (1) needs to be 1 μm or less, and is preferably 0.5 μm or less and more preferably 0.1 μm or less. When the particle size is 1 μm or less, cell reaction efficiency is improved and cell output can be improved, compared to cases of particle sizes higher than that. The lower limit of the particle size of the block copolymer in the dispersion is not particularly restricted, but, in view of adjusting it to a particle size necessary for it that the block copolymer phase separates into a phase having ion-conductive groups and a phase having no ion-conductive group, the particle size is preferably 10 nm or more and more preferably 40 nm or more. The particle size in the dispersion can be measured by methods generally used, for example, a dynamic light scattering method or the like.

Processes of obtaining a dispersion of the block copolymer in the method (1) are not particularly restricted, and there can be mentioned a process of emulsifying the block copolymer in an aqueous dispersion medium, a process of obtaining such a dispersion by liquid phase polymerization such as emulsion polymerization or suspension polymerization, etc., but, the process of emulsifying the block copolymer is preferred.

As methods of emulsifying the block copolymer, there can be used a direct emulsification method comprising dispersing a melt of the block copolymer into an aqueous dispersion medium at temperatures higher than the melting point of the block copolymer. The aqueous dispersion medium means water or a solvent mainly comprising water. As another method, there can be used a solution inversion emulsification method comprising dissolving the block copolymer in an organic solvent and then dispersing the solution in an aqueous dispersion medium. As organic solvents used for dissolution of the block copolymer and organic solvents mixed with water used as a dispersion medium, there can be exemplified alcohols such as methanol, ethanol, propanol and isopropanol; halogenated hydrocarbons such as methylene chloride; aromatic hydrocarbons such as toluene, xylene and benzene; straight-chain aliphatic hydrocarbons such as hexane and heptane; cyclic aliphatic hydrocarbons such as cyclohexane; ethers such as tetrahydrofuran; and further, acetonitrile, nitromethane, dimethyl sulfoxide, N-methylpyrrolidone, N,N-dimethylformamide, N,N-dimethylacetamide, etc. These solvents can be used each alone or in a combination of two or more. When an organic solvent is used in dispersion of the copolymer, it is preferred to remove the organic solvent after the dispersion was made. The removal of the organic solvent can be made utilizing azeotropy with water, for example, using a reaction vessel equipped with a stirrer and a condenser, an extruder equipped with a vent, a rotary evaporator or the like. The removal of the organic solvent can be made either under atmospheric pressure or under reduced pressure.

Dispersion of the block copolymer can be made using a vessel equipped with a stirring means. The stirring means is not particularly restricted, but, in view of generating large shearing force, turbine stirrers, colloid mills, homomixers and homogenizers are preferred. The dispersion can also be made using a line mixer equipped with a movable stirring apparatus, an immovable line mixer (Static Mixer, trade name, made by Noritake Co., Ltd.) or the like. It is further possible to conduct dispersion once by a stirring means as mentioned above and, then, conduct a treatment of finely dispersing the copolymer using a high pressure homogenizer (Manton Gaulin, trade name, made by APV GAULIN Inc.; Microfluidizer, trade name, Mizuho Industries Co., Ltd.; Nanomizer, trade name, made by Yoshida Kikai Kogyo Co., Ltd.; etc.) or the like.

When the copolymer is dispersed in an aqueous dispersion medium, a surfactant can be used as an emulsifier or dispersant, and there can be used nonionic surfactants, anionic surfactants, etc. The use amount of the surfactant is usually in the range of 0.1 to 40 parts by mass and preferably in the range of 0.1 to 20 parts by mass based on 100 parts by mass of the block copolymer used, but it is desirable to use it at a necessary minimum amount.

As the nonionic surfactants, there can, for example, be mentioned polyethylene glycol-type nonionic surfactants, polyhydric alcohol-type nonionic surfactants, etc. As the polyethylene glycol-type nonionic surfactants, there can, for example, be mentioned ethylene oxide adducts of higher alcohols, ethylene oxide adducts of alkylphenols, ethylene oxide adducts of fatty acids, ethylene oxide adducts of polyhydric alcohol fatty acid esters, ethylene oxide adducts of higher alkylamines, ethylene oxide adducts of fatty acid amides, ethylene oxide adducts of fats and oils, ethylene oxide adducts of polypropylene glycols, etc. As the polyhydric alcohol-type nonionic surfactants, there can, for example, be mentioned glycerol fatty acid esters, pentaerythritol fatty acid esters, sorbitol fatty acid esters, sorbitan fatty acid esters, sucrose fatty acid esters, polyhydric alcohol alkyl ethers, alkanolamine fatty acid amides, etc.

As the anionic surfactants, there can, for example, be mentioned primary higher fatty acid salts, secondary higher fatty acid salts, primary higher alcohol sulfate esters, secondary higher alcohol sulfate esters, primary higher alkylsulfonate salts, secondary higher alkylsulfonate salts, higher alkyldisulfonate salts, sulfonated higher fatty acid salts, alkoxysulfonyl-higher fatty acid salts, higher fatty acid ester-sulfonate salts, salts of sulfonated higher alcohol ethers, alkylbenzenesulfonate salts, alkylphenolsulfonate salts, alkylnaphthalenesulfonate salts, alkylbenzimidazolesulfonate salts, alkyl phosphate salts, salts of phosphonated alkyl ethers, salts of phosphonated alkyl allyl ethers, etc.

These surfactants can be used alone or in a combination of two or more.

There is no particular restriction on methods for mixing of the dispersion with the catalyst particles, and the mixing can be made using a vessel equipped with such a stirring means as can be used in the above-mentioned emulsification of the block copolymer.

There is no particular restriction on methods for formation of a catalyst layer of the electrode from the mixture liquid of the block copolymer and the catalyst particles, and known methods such as printing methods and spraying methods can be adopted.

A membrane-electrode assembly using the catalyst layer of the invention is described below. As to preparation processes of membrane-electrode assemblies, there is no particular restriction, and known processes can be used. For example, there can be mentioned a process of forming the catalyst layer on a gas diffusion layer to prepare a gas diffusion electrode, and then bonding a pair of the gas diffusion electrodes, with each catalyst layer being made to be inside, to both sides of a polymer electrolyte membrane by a hot press or the like; and a process of forming the catalyst layer of the invention onto both sides of a polymer electrolyte membrane, and then press bonding a gas diffusion layer onto each catalyst layer by a hot press or the like. As still another preparation process, there is a process of forming the catalyst layer on a substrate film such as one made of polytetrafluoroethylene (PTFE), transferring a pair of the catalyst layers on the substrate films onto both sides of a polymer electrolyte membrane by thermocompression bonding, peeling off the substrate films to obtain an assembly of the electrolyte membrane and the catalyst layers, and then press bonding a gas diffusion layer onto each catalyst layer. Further, when the catalyst layer and the polymer electrolyte membrane are integrated, there is a process of applying a solution or suspension containing a polymer electrolyte onto both sides of a polymer electrolyte membrane and/or onto the surfaces of the catalyst layers in a pair of the gas diffusion electrodes, sticking the polymer electrolyte membrane and the surfaces of the catalyst layers together, and then bonding them by thermocompression bonding or the like. In this case, the solution or suspension can be applied onto any one or both of the polymer electrolyte membrane and the surfaces of the catalyst layers. In these methods, it is possible to conduct the above process in a state that the ion-conductive groups are made to salts with a metal such as Na, and restore the proton type by acid treatment after the bonding.

As the polymer electrolyte membrane constituting the membrane-electrode assembly, there can, for example, be used an electrolyte membrane comprises an existing perfluorocarbonsulfonic polymer such as "Nafion" (registered trade mark, made by Du Pont Co.) or "Gore-select" (registered trade mark, made by Gore Co.), an electrolyte membrane comprises a sulfonated polyether sulfone or a sulfonated polyether ketone, an electrolyte membrane comprises a polybenzimidazole impregnated with phosphoric acid or sulfuric acid, etc. It is also possible to make an electrolyte membrane of the block copolymer constituting the ion-conductive binder to be used in the catalyst layer of the invention. For further heightening adhesion between the polymer electrolyte membrane and the gas diffusion electrode, it is preferred to use an electrolyte membrane made of the same material as that of the block copolymer in the ion-conductive binder used in the catalyst layer of the invention.

The gas diffusion layer of the membrane-electrode assembly is composed of a material having electrical conductivity and gas permeability, and as the material, there can, for example, be mentioned a porous material composed of carbon fiber such as carbon paper or carbon cloth. Such a material can be subjected to water repellent treatment for heightening water repellency.

By inserting a membrane-electrode assembly obtained by a process as mentioned above between electrically conductive separator materials having both of a role of separation of the electrode chamber and a role of paths for gas supply to the electrode, a polymer electrolyte fuel cell can be obtained. The membrane-electrode assembly of the invention can be used as a membrane-electrode assembly for polymer electrolyte fuel cells such as a hydrogen-dedicated one using hydrogen as the fuel gas, a methanol-reforming one using hydrogen obtained by reforming methanol, a natural gas-reforming one using hydrogen obtained by reforming natural gas, a gasoline-reforming one using hydrogen obtained by reforming gasoline and a direct methanol one wherein methanol is used directly.

The fuel cell of the invention using the membrane-electrode assembly is excellent in electrode reaction efficiency, and, therefore, it is possible to improve cell efficiency or reduce the use amount of noble metal catalysts used in the electrodes. In addition, the fuel cell is excellent in chemical stability, and has an advantage that lowering of power generation characteristic with the lapse of time is small, and thus can be used stably for a long time.

EXAMPLES

The invention is further specifically described below through referential examples, examples and comparative examples, but the invention is not limited by these examples.

Referential Example 1

Preparation of a block copolymer composed of poly (α-methylstyrene) Block (Polymer Block (A)) and Hydrogenated Polybutadiene Block (Polymer Block (B))

In a similar process to a previously reported process (WO 02/40611 A), a poly (α-methylstyrene)-b-polybutadiene-b-poly (α-methylstyrene) triblock copolymer (hereinafter abbreviated as mSEBmS) was synthesized. The number average molecular weight (GPC measurement, in terms of polystyrene) of the resulting mSEBmS was 76,000, and the amount of the 1,4-bond determined by $^1$H-NMR measurement was 55% and the content of the α-methylstyrene unit also determined by the $^1$H-NMR measurement was 30.0% by mass. Further, it was revealed by composition analysis through $^1$H-NMR spectrum measurement that α-methylstyrene was not substantially copolymerized into the polybutadiene block.

A solution of the synthesized mSEBmS in cyclohexane was prepared, the solution was put in a pressure proof vessel whose atmosphere had sufficiently been replaced with nitrogen, and then, hydrogenation reaction was conducted at 80° C. for 5 hours in the atmosphere of hydrogen using a Ni/Al Ziegler hydrogenating catalyst to obtain a poly (α-methylstyrene)-b-hydrogenated polybutadiene-b-poly (α-methylstyrene) triblock copolymer (hereinafter abbreviated as HmSEBmS). The hydrogenation proportion of the HmSEBmS was calculated by $^1$H-NMR spectrum measurement to be 99.6%.

Referential Example 2

Preparation of a Block Copolymer Composed of Polystyrene (Polymer Block (A)), Hydrogenated Polyisoprene (Polymer Block (B1)) and Poly (Tert-Butylstyrene) (Polymer Block (B2))

The block copolymer was synthesized in a similar process to a previously reported process (JP 2006-49002 A). Namely, after 568 ml of dehydrated cyclohexane and 1.14 ml of sec-butyllithium (1.3M-cyclohexane solution) were put in a 1,000-ml egg-plant type flask, 4.27 ml of styrene, 53.3 ml of 4-tert-butylstyrene, 66.4 ml of isoprene, 52.6 ml of 4-tert-butylstyrene and 9.30 ml of styrene were added successively and polymerized respectively at 60° C. to synthesize polystyrene-b-poly(4-tert-butylstyrene)-b-polyisoprene-b-poly(4-tert-butylstyrene)-b-polystyrene (hereinafter, abbreviated as StBSItBSS). The number average molecular weight (GPC measurement, in terms of polystyrene) of the obtained StB-SItBSS was 167,471, the amount of the 1,4-bond, the content of the styrene unit and the content of the 4-tert-butylstyrene unit determined by $^1$H-NMR measurement were 93.5%, 9.6% by mass and 62.2% by mass, respectively.

A solution of the synthesized StBSItBSS in cyclohexane was prepared, the solution was put in a pressure proof vessel whose atmosphere had sufficiently been replaced with nitrogen, and then, hydrogenation reaction was conducted at 50° C. for 12 hours in the atmosphere of hydrogen using an Ni/Al Ziegler hydrogenating catalyst to obtain a polystyrene-b-poly(4-tert-butylstyrene)-b-hydrogenated polyisoprene-b-poly(4-tert-butylstyrene)-b-polystyrene (hereinafter abbreviated as StBSEPtBSS). The hydrogenation proportion of the StB-SEPtBSS was calculated by $^1$H-NMR spectrum measurement to be 99.9%.

Example 1

(1) Synthesis of Sulfonated HmSEBmS

A sulfonating reagent was prepared by reacting 49.5 ml of acetic anhydride with 22.1 ml of sulfuric acid at 0° C. in 99.0 ml of methylene chloride. Separately, 100 g of the block copolymer HmSEBmS obtained in Referential example 1 was vacuum dried for 1 hour in a glass-made reaction vessel equipped with a stirrer, the inside atmosphere of the reaction vessel was replaced with nitrogen, 1,000 ml of methylene chloride was added, and the mixture was stirred at 35° C. for 4 hours to dissolve the block copolymer. After the dissolution, the sulfonating reagent was gradually added dropwise thereto over a period of 20 minutes. After stirring at 35° C. for 6 hours, the polymer solution was poured into 2 L of distilled water under stirring to coagulate and deposit the polymer. The deposited solid matter was washed with distilled water of 90° C. for 30 minutes, and then filtered. This operation of washing and filtration was repeated until the pH of the washings became unchanged, and the polymer after the final filtration was vacuum dried to obtain a sulfonated HmSEBmS. The ion exchange capacity of the sulfonated HmSEBmS was 1.73 meq/g. The measurement of ion exchange capacitiy was made according to the following process.

Measurement of Ion Exchange Capacity

A sample was weighed (a (g) in a glass vessel which can be shut tightly, an excess amount of an aqueous saturated solution of sodium chloride was added thereto, and the mixture was stirred overnight. Hydrogen chloride formed in the system was titrated (b (ml)) with a 0.01 N aqueous NaOH standard solution (titer f) using a phenolphthalein solution as an indicator. The ion exchange capacity of the sample was calculated according to the following equation.

$$\text{Ion exchange capacity} = (0.01 \times b \times f)/a$$

(2) Preparation of an Aqueous Dispersion of the Sulfonated HmSEBmS

A 5% by mass solution of the sulfonated HmSEBmS (toluene/isobutyl alcohol=7/3) was prepared, and while the solution was stirred at 5,000 r.p.m. using a homogenizer (CLEARMIX made by M-TECHNIQUE Co., Ltd.), water was added at a rate of 0.5 ml/min. At the time when the viscosity of the mixture rose and the stirring became difficult, the rotational frequency was raised to 7,000 r.p.m. and, at the same time, the addition rate of water was raised to 5 ml/min, and, then, the polymer solution was suspended. The solvent was removed using an evaporator to finally obtain an aqueous 5% by mass dispersion of the polymer. The average particle size of the sulfonated HmSEBmS in the aqueous dispersion was about 10 μm.

(3) The aqueous dispersion obtained in (2) was treated by a high pressure homogenizer (Nanomizer mark II made by Yoshida Kikai Kogyo Co., Ltd.) to Obtain an Aqueous Dispersion of the Sulfonated HmSEBmS having an average particle size of about 100 nm.

(4) Preparation of an Anode

The dispersion obtained in Example 1(3), a catalyst and n-propyl alcohol were mixed to prepare a uniformly dispersed catalyst paste, and the paste was applied uniformly on one side of a sheet of carbon paper made by Toray Industries, Inc., left alone at room temperature for several hours and dried at 60° C. for 30 minutes to prepare an anode. As the catalyst for the anode was used a Pt—Ru supported on carbon made by Tanaka Kikinzoku Kogyo Co., Ltd. (TEC61E54, Pt:Ru:carbon=30:23:47). In the prepared anode, Pt amount was 1.00 mg/cm$^2$ and the ratio of the block copolymer/the catalyst metal was 0.49 (mass ratio).

(5) Preparation of a Cathode

An aqueous dispersion of Nafion (DE1021, a perfluorocarbonsulfonic acid polymer) made by Dupont Co., a catalyst and n-propyl alcohol were mixed to prepare a uniformly dispersed catalyst paste, and the paste was applied uniformly on one side of a water repellent treated sheet of carbon paper made by Toray Industries, Inc., left alone at room temperature for several hours and dried at 115° C. for 30 minutes to prepare a cathode. As the catalyst for the cathode was used a Pt supported on carbon made by Tanaka Kikinzoku Kogyo Co., Ltd. (TEC10E50E, Pt:carbon=47:53). In the prepared cathode, Pt amount was 1.02 mg/cm$^2$ and the ratio of Nafion/the catalyst metal was 0.85 (mass ratio).

(6) Preparation of a Membrane-Electrode Assembly

Nafion 117 (a perfluorocarbonsulfonic acid polymer, membrane thickness 175 μm, 9 cm×9 cm), the anode obtained in Example 1(4) (5 cm×5 cm) and the cathode obtained in Example 1(5) (5 cm×5 cm) were stuck together to prepare a membrane-electrode assembly.

Example 2

(1) Synthesis of a sulfonated StBSEPtBSS

A sulfonated StBSEPtBSS was synthesized in the same manner as in Example 1(1). Specifically, first, a sulfonating reagent was prepared by reacting 14.8 ml of acetic anhydride with 6.62 ml of sulfuric acid at 0° C. in 29.6 ml of methylene chloride. Separately, 20 g of the block copolymer StBSEPtBSS obtained in Referential example 2 was vacuum dried for 1 hour in a glass-made reaction vessel equipped with a stirrer, the inside atmosphere of the reaction vessel was replaced with nitrogen, 262 ml of methylene chloride was added, and the mixture was stirred at room temperature for 4 hours to dissolve the block copolymer. After the dissolution, the sulfonating reagent was gradually added dropwise thereto over a period of 20 minutes. After stirring at room temperature for 48 hours, 50 ml of methylene chloride was added to dilute the polymer solution. The polymer solution was poured into 2 L of distilled water under stirring to coagulate and deposit the polymer. The deposited solid matter was washed with distilled water of 90° C. for 30 minutes, and then filtered. This operation of washing and filtration was repeated until the pH of the washings became unchanged, and the polymer after the final filtration was vacuum dried to obtain a sulfonated StB-SEPtBSS. The ion exchange capacity of the sulfonated StB-SEPtBSS was 0.86 meq/g.

(2) Preparation of an Aqueous Dispersion of the Sulfonated StBSEPtBSS

A 5% by mass solution of the sulfonated StBSEPtBSS (toluene/isobutyl alcohol=8/2) was prepared. While a thin film rotary high speed homogenizer (Filmics made by Primix Co., Ltd.) was rotated at a peripheral speed of 30 m/s, the polymer solution and water were added thereto respectively at rates of 70 ml/min and 80 ml/min to cause phase inversion and emulsification. The solvent was removed using an evaporator to obtain an aqueous 5% by mass dispersion of the polymer. The average particle size of the sulfonated StBSEPtBSS in the aqueous dispersion was about 7.0 μm.

(3) The aqueous dispersion obtained in (2) was treated by a high pressure homogenizer (Nanomizer mark II made by Yoshida Kikai Kogyo Co., Ltd.) to obtain an aqueous dispersion of the sulfonated StBSEPtBSS having an average particle size of about 53 nm.

(4) Preparation of an Anode

An anode was prepared in the same manner as in Example 1(4) except for using the dispersion obtained in Example 2(3). In the anode, Pt amount was 1.00 mg/cm$^2$ and the ratio of the block copolymer/the catalyst metal was 0.89 (mass ratio).

(5) Preparation of a Membrane-Electrode Assembly

A membrane-electrode assembly was prepared in the same manner as in Example 1(6) except for using the anode obtained in Example 2(4).

Example 3

(1) Preparation of an Anode

An aqueous dispersion of Nafion (DE1021, a perfluorocarbonsulfonic acid polymer) made by Dupont Co., a catalyst and n-propyl alcohol were mixed to prepare a uniformly dispersed catalyst paste, and the paste was applied uniformly on one side of a sheet of carbon paper made by Toray Industries, Inc., left alone at room temperature for several hours and dried at 115° C. for 30 minutes to prepare an anode. As the catalyst for the anode was used a Pt—Ru supported on carbon made by Tanaka Kikinzoku Kogyo Co., Ltd. (TEC61E54, Pt:Ru:carbon=30:23:47). In the prepared anode, Pt amount was 1.00 mg/cm$^2$ and the ratio of the Nafion/the catalyst metal was 0.89 (mass ratio).

(2) Preparation of a Cathode

The dispersion obtained in Example 2(3), a catalyst and n-propyl alcohol were mixed to prepare a uniformly dispersed catalyst paste, and the paste was applied uniformly on one side of a water repellent treated sheet of carbon paper made by Toray Industries, Inc., left alone at room temperature for several hours and dried at 60° C. for 30 minutes to prepare a cathode. As the catalyst for the cathode was used a Pt supported on carbon made by Tanaka Kikinzoku Kogyo Co., Ltd. (TEC10E50E, Pt:carbon=47:53). In the prepared cathode, Pt amount was 1.00 mg/cm$^2$ and the ratio of the block copolymer/the catalyst metal was 0.49 (mass ratio).

(3) Preparation of a Membrane-Electrode Assembly

A membrane-electrode assembly was prepared by sticking together Nafion 212 (a perfluorocarbonsulfonic acid polymer, membrane thickness 50 μm, 9 cm×9 cm) made by Dupont Co., the anode obtained in Example 3(1) (5 cm×5 cm) and the cathode obtained in Example 3(2) (5 cm×5 cm).

Comparative Example 1

(1) Preparation of an Anode

An anode was prepared in the same manner as in Example 1(4) except for using the aqueous dispersion of the sulfonated HmSEBmS (the average particle size is about 10 μm) obtained in Example 1(2). In the anode, Pt amount was 1.04 mg/cm$^2$ and the ratio of the block copolymer/the catalyst metal was 0.50 (mass ratio).

(2) Preparation of a Membrane-Electrode Assembly

A membrane-electrode assembly was prepared in the same manner as in Example 1(6) except for using the anode obtained in Comparative example 1(1).

Comparative Example 2

(1) Preparation of an Anode

An anode was prepared in the same manner as in Example 1(4) except that a uniform solution of the sulfonated HmSEBmS obtained in Example 1(1) which solution was prepared by dissolving the sulfonated HmSEBmS in THF was used in place of the dispersion of Example 1(4). In the anode, Pt amount was 1.02 mg/cm$^2$ and the ratio of the block copolymer/the catalyst metal was 0.50 (mass ratio).

(2) Preparation of a Membrane-Electrode Assembly

A membrane-electrode assembly was prepared in the same manner as in Example 1(6) except for using the anode obtained in Comparative example 2(1).

Comparative Example 3

(1) Preparation of an Anode

An anode was prepared in the same manner as in Example 1(4) except that a uniform solution of the sulfonated StBSEPtBSS obtained in Example 2(1) which solution was prepared by dissolving the sulfonated StBSEPtBSS in THF was used in place of the dispersion of Example 1(4). In the anode, Pt amount was 1.00 mg/cm$^2$ and the ratio of the block copolymer/the catalyst metal was 0.89 (mass ratio).

(2) Preparation of a Membrane-Electrode Assembly

A membrane-electrode assembly was prepared in the same manner as in Example 1(6) except for using the anode obtained in Comparative example 3(1).

Comparative Example 4

(1) Preparation of a Cathode

A cathode was prepared in the same manner as in Example 3(2) except that a uniform solution of the sulfonated StBSEPtBSS obtained in Example 2(1) which solution was prepared by dissolving the sulfonated StBSEPtBSS in THF was used in place of the dispersion of Example 3(2). In the cathode, Pt amount was 1.00 mg/cm$^2$ and the ratio of the block copolymer/the catalyst metal was 0.51 (mass ratio).

(2) Preparation of a Membrane-Electrode Assembly

A membrane-electrode assembly was prepared in the same manner as in Example 3(3) except for using the cathode obtained in Comparative example 4(1).

Comparative Example 5

(1) Preparation of an Emulsion Having an Average Particle Size of 11 μm 11.2 g of a methacrylate reactive emulsifier (Eleminol RS-30 made by SANYO CHEMICAL INDUSTRIES, LTD.), 0.8 g of trimethylolpropane triacrylate (a cross-linking agent) and 0.730 g of sodium carbonate (a stabilizer) was suspended in 146.4 g of water, 1.0 g of an aqueous 2.0% potassium persulfate solution was added to the suspension in the atmosphere of nitrogen, and the mixture was heated to 80°

C. and stirred for 3 hours to obtain an emulsion having an average particle size of 11 μm.

(2) Preparation of an Anode

The emulsion obtained in Comparative example 5(1) and a catalyst were mixed to prepare a uniformly dispersed catalyst paste, and the paste was applied uniformly on one side of a sheet of carbon paper made by Toray Industries, Inc., left alone at room temperature for several hours and dried at 60° C. for 30 minutes. The resulting product was immersed in 1N-sulfuric acid at room temperature for 24 hours to obtain an anode wherein the product was ion exchanged to a proton exchange type. As the catalyst for the anode was used a Pt—Ru supported on carbon made by Tanaka Kikinzoku Kogyo Co., Ltd. (TEC61E54, Pt:Ru:carbon=30:23:47). In the prepared anode, Pt amount was 1.00 mg/cm$^2$ and the ratio of the block copolymer/the catalyst metal was 0.90 (mass ratio).

(3) Preparation of a Membrane-Electrode Assembly

A membrane-electrode assembly was prepared in the same manner as in Example 1(6) except for using the anode obtained in Comparative example 5(2).

Performance Tests of the Membrane-Electrode Assemblies of Examples and Comparative examples 1) Evaluation of the Power Generation Performance of a Single Cell for Fuel Cells (Anode)

Each of the membrane-electrode assemblies prepared in Example 1, Example 2 and Comparative examples 1 to 3 was put between two sheets of electrically conductive separators also having a role of paths for gas supply, the resulting composite was put between two electric current-collecting sheets, and the resulting composite was put between two clamping sheets to assemble a single cell for polymer electrolyte fuel cells. A gasket was placed between each membrane-electrode assembly and each separator for preventing gas leak from a difference in level corresponding to the thickness of the electrode. As the fuel, an aqueous 5 mol/L MeOH solution was used, and as the oxidizing agent, oxygen humidified by a bubbler of 60° C. was used. Test conditions were set as follows and electric current-voltage characteristics were evaluated. Anode flow rate: 1 ml/min, cathode flow rate: 250 ml/min, cell temperature: 60° C.

2) Evaluation of the Power Generation Performance of a Single Cell for Fuel Cells (Cathode)

Each of the membrane-electrode assemblies prepared in Example 3 and Comparative example 4 was put between two sheets of electrically conductive separators also having a role of paths for gas supply, the resulting composite was put between two electric current-collecting sheets, and the resulting composite was put between two clamping sheets to assemble a single cell for polymer electrolyte fuel cells. A gasket was placed between each membrane-electrode assembly and each separator for preventing gas leak from a difference in level corresponding to the thickness of the electrode. As the fuel, hydrogen humidified by a bubbler of 60° C. was used, and as the oxidizing agent, air humidified by a bubbler of 60° C. was used. Test conditions were set as follows and electric current-voltage characteristics were evaluated. Anode flow rate: 261 ml/min, cathode flow rate: 250 ml/min, cell temperature: 60° C.

Electron Microscope Photographs of the Catalyst Layers of the Electrodes Obtained in Example 1, Example 2, Comparative example 1 and Comparative example 2

The electron microscope photographs of the catalyst layer of the anode obtained in Example 1(4) is shown in FIG. 2. The block copolymer in the catalyst layer forms such a core-shell structure that the phase having ion-conductive groups is a shell phase and the phase having no ion-conductive group is a core phase. Such a structure was shown clearly that the shell phases of the core-shell structures form continuous ion paths, and, further, the ion paths, the catalyst particles and the voids (porosity 10%) form interfaces, namely three-phase interfaces acting as electrode reaction sites. It was shown clearly likewise as to the catalyst layer of the anode obtained in Example 2(1) and shown in FIG. 3 that the block copolymer forms a core-shell structure and, further, the ion paths, the catalyst particles and the voids (porosity 15%) form three-phase interfaces. In this connection, a porosity in a catalyst layer was calculated by averaging the porosities in electron microscope photographs at any 5 positions. On the other hand, as to the catalyst layer of the anode prepared in Comparative example 1 and shown in FIG. 4, the phase separation structure of the block copolymer is recognized, but there is no continuity of phases having ion-conductive groups and thus formation efficiency of ion paths is bad, and, further, the contact parts between the ion-conductive binder and the catalyst particles are covered with both of phases having ion-conductive groups and phases having no ion-conductive group and thus formation efficiency of three-phase interfaces is bad. As to the catalyst layer of the anode prepared in Comparative example 2 and shown in FIG. 5, the phase separation structure of the block copolymer as an ion-conductive binder cannot be obtained and the formation efficiency of ion paths is bad.

Results of Anode Performance Evaluation Tests of Single Cells

As to the membrane-electrode assemblies prepared in Example 1, Example 2 and Comparative examples 1 to 3 and 5, the results of power generation performance evaluation tests of the single cells for polymer electrolyte fuel cells are shown in Table 1. It was made clear from comparison between Example 1 and Comparative example 1 that the electrode catalyst layer of the invention shows higher cell output and enhances cell reaction efficiency compared to the electrode prepared from the dispersion wherein the particle size of the block copolymer is 10 μm. Furthermore, it was made clear from comparison between Example 1 and Comparative example 2 and comparison between Example 2 and Comparative example 3 that the electrodes of the invention show higher cell output and enhance cell reaction efficiency compared to the electrode catalyst layers prepared using the solutions of the block copolymers, and the superiority of the electrode structure of the present invention was proved. Further, in Comparative example 5, cross-linked fine particles analogous to the electrolyte fine particles disclosed in JP 2003-123771 A were used as an ion-conductive binder, and as a result, it was confirmed that the performance of the anode is lower than that of the structure of the invention wherein ion channels are controlled, and the superiority of the present invention was shown.

TABLE 1

|  | Block copolymer used in anode, and liquid state | Ion exchange capacity of block copolymer (meq/g) | Block copolymer/ Catalyst metal (mass ratio) | Maximum power density (mW/cm$^2$) |
|---|---|---|---|---|
| Example 1 | Sulfonated HmSEBmS Dispersion (100 nm particles) | 1.73 | 0.5 | 37 |
| Example 2 | Sulfonated StBSEPtBSS Dispersion (53 nm particles) | 0.86 | 0.9 | 47 |
| Comparative example 1 | Sulfonated HmSEBmS Dispersion (10 μm particles) | 1.73 | 0.5 | 7 |
| Comparative example 2 | Sulfonated HmSEBmS Uniform solution | 1.73 | 0.5 | 31 |
| Comparative example 3 | Sulfonated StBSEPtBSS Uniform solution | 0.86 | 0.9 | 38 |
| Comparative example 5 | — | — | 0.9 | 10 |

Results of Cathode Performance Evaluation Tests of Single Cells

As to the membrane-electrode assemblies prepared in Example 3 and Comparative example 4, the results of power generation performance evaluation tests of the single cells for polymer electrolyte fuel cells are shown in Table 2. It was made clear from comparison between Example 3 and Comparative example 4 that the electrode of the invention shows higher cell output and enhances cell reaction efficiency compared to the electrode catalyst layer prepared using the solution of the block copolymer, and the superiority of the electrode structure of the present invention was proved.

TABLE 2

|  | Block copolymer used in cathode, and liquid state | Ion exchange capacity of block copolymer (meq/g) | Block copolymer/ Catalyst metal (mass ratio) | Maximum power density (mW/cm$^2$) |
|---|---|---|---|---|
| Example 2 | Sulfonated StBSEPtBSS Dispersion (53 nm particles) | 0.86 | 0.5 | 135 |
| Comparative example 4 | Sulfonated StBSEPtBSS Uniform solution | 0.86 | 0.5 | 108 |

Measurement of Change of Voltage to Current Density on the Single Cells of Examples and Comparative Examples As to the membrane-electrode assemblies prepared in Examples 1 to 3 and Comparative examples 1 to 4, change of voltage to current density was measured as a power generation characteristic of the single cells for polymer electrolyte fuel cells. The electric current-voltage characteristics are shown in FIGS. 6 to 12.

Figure 1:
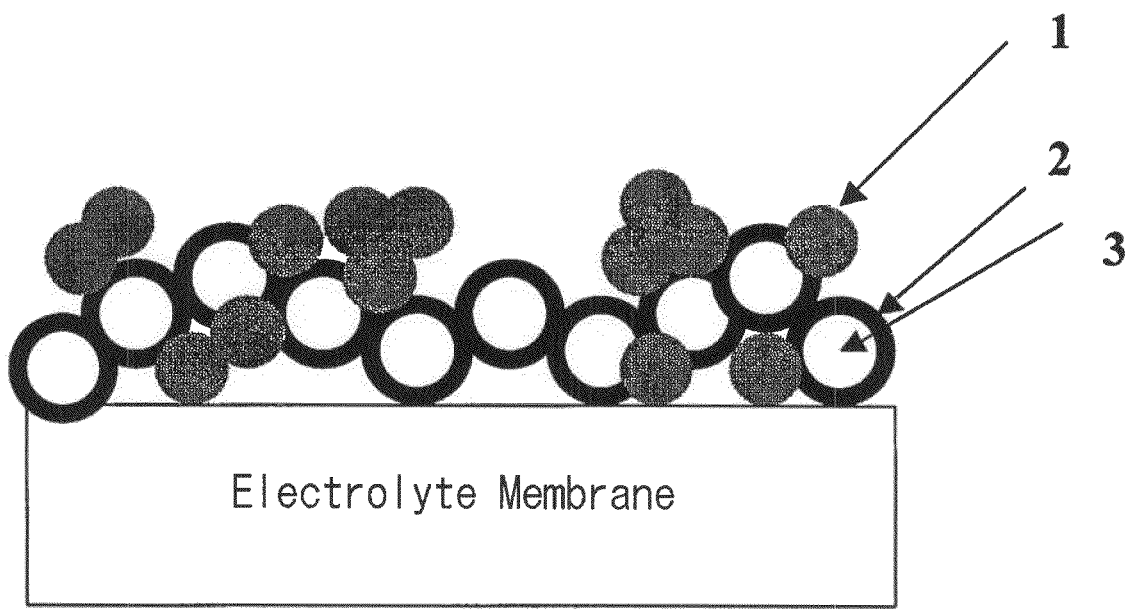
FIG. 1 is a schematic view showing the structure of the catalyst layer of an electrode for fuel cells of the invention.
Figure 2:
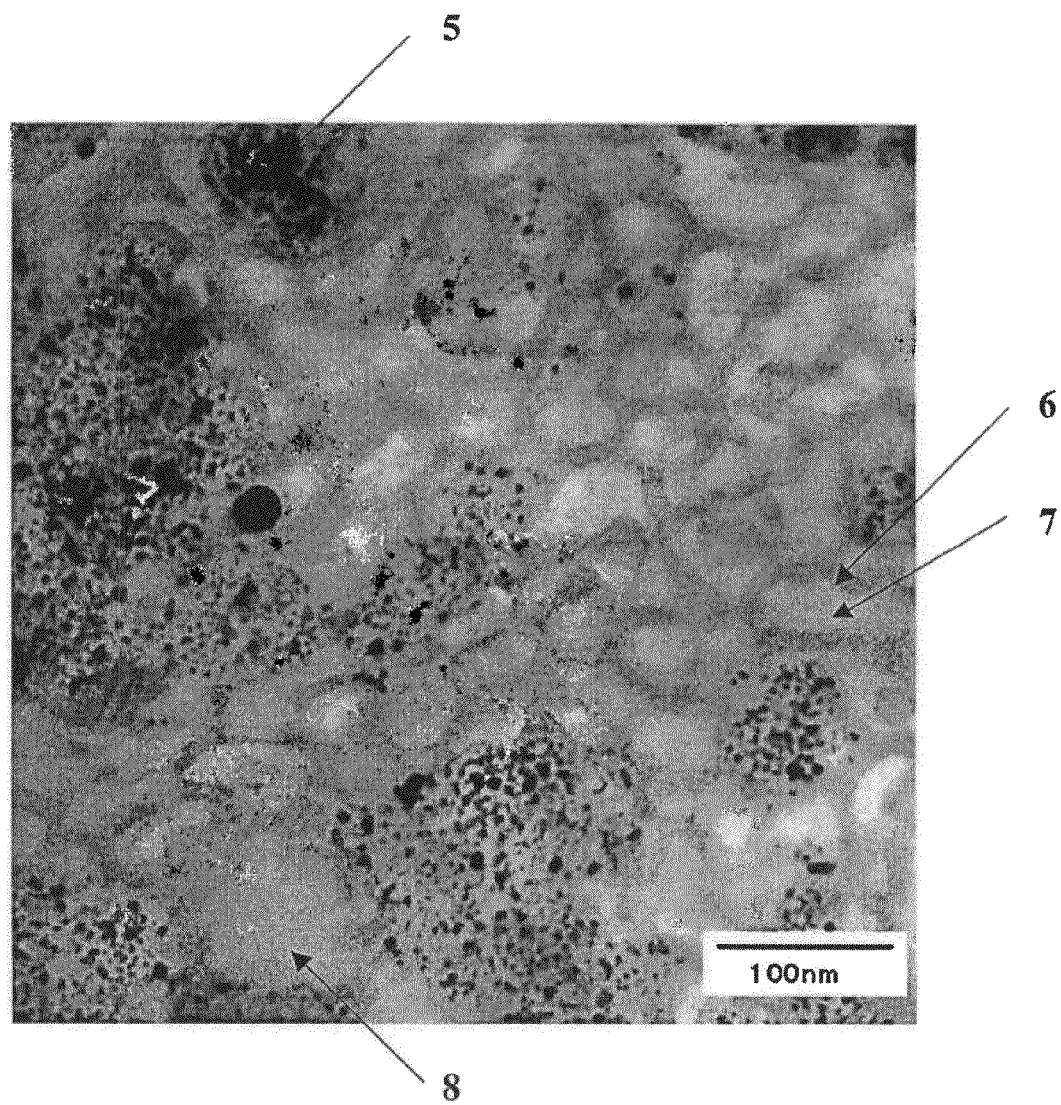
FIG. 2 is an electron microscope photograph of the catalyst layer of the anode for polymer electrolyte fuel cells obtained in Example 1(4).
Figure 3:
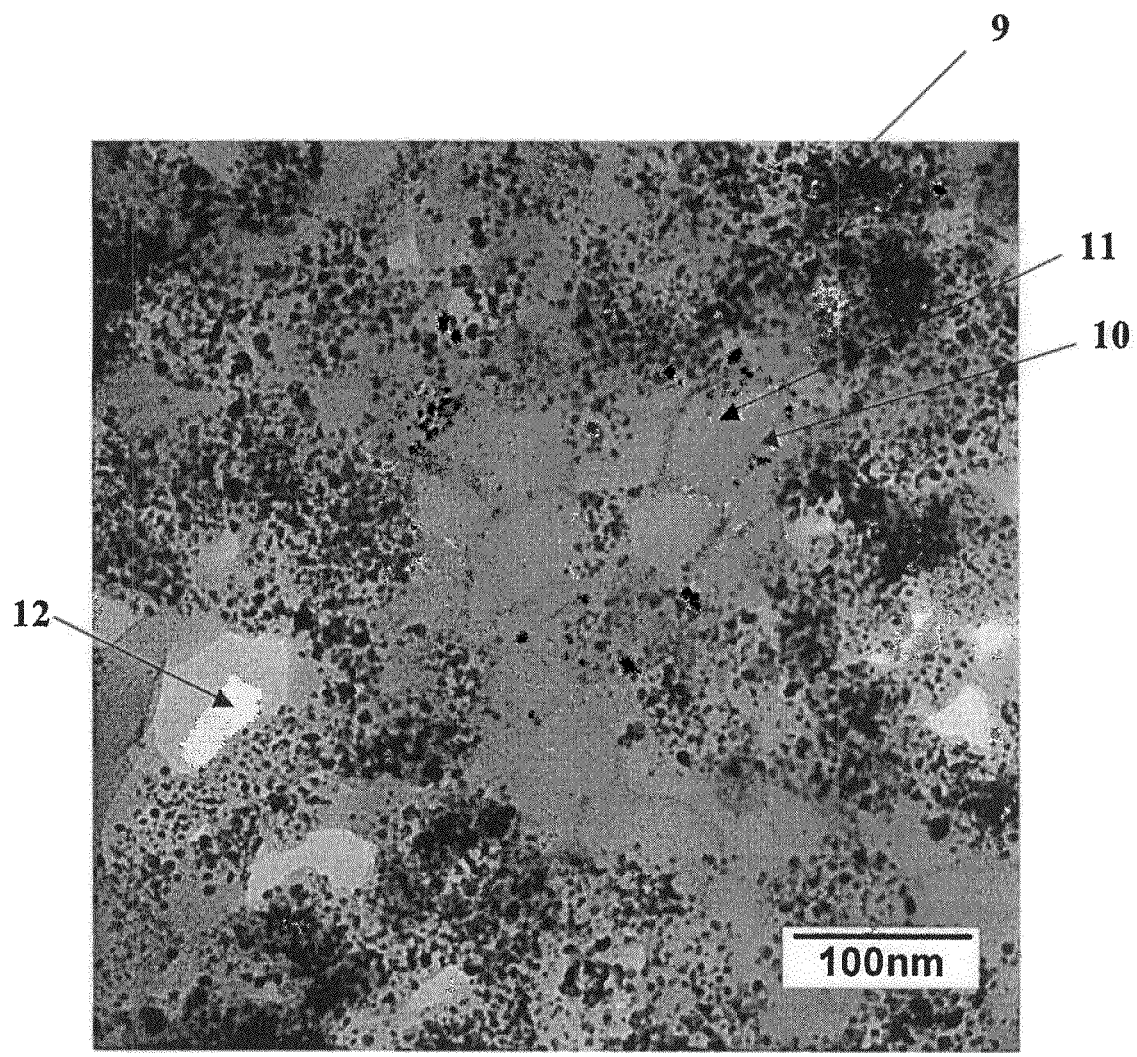
FIG. 3 is an electron microscope photograph of the catalyst layer of the anode for polymer electrolyte fuel cells obtained in Example 2(4).
Figure 4:
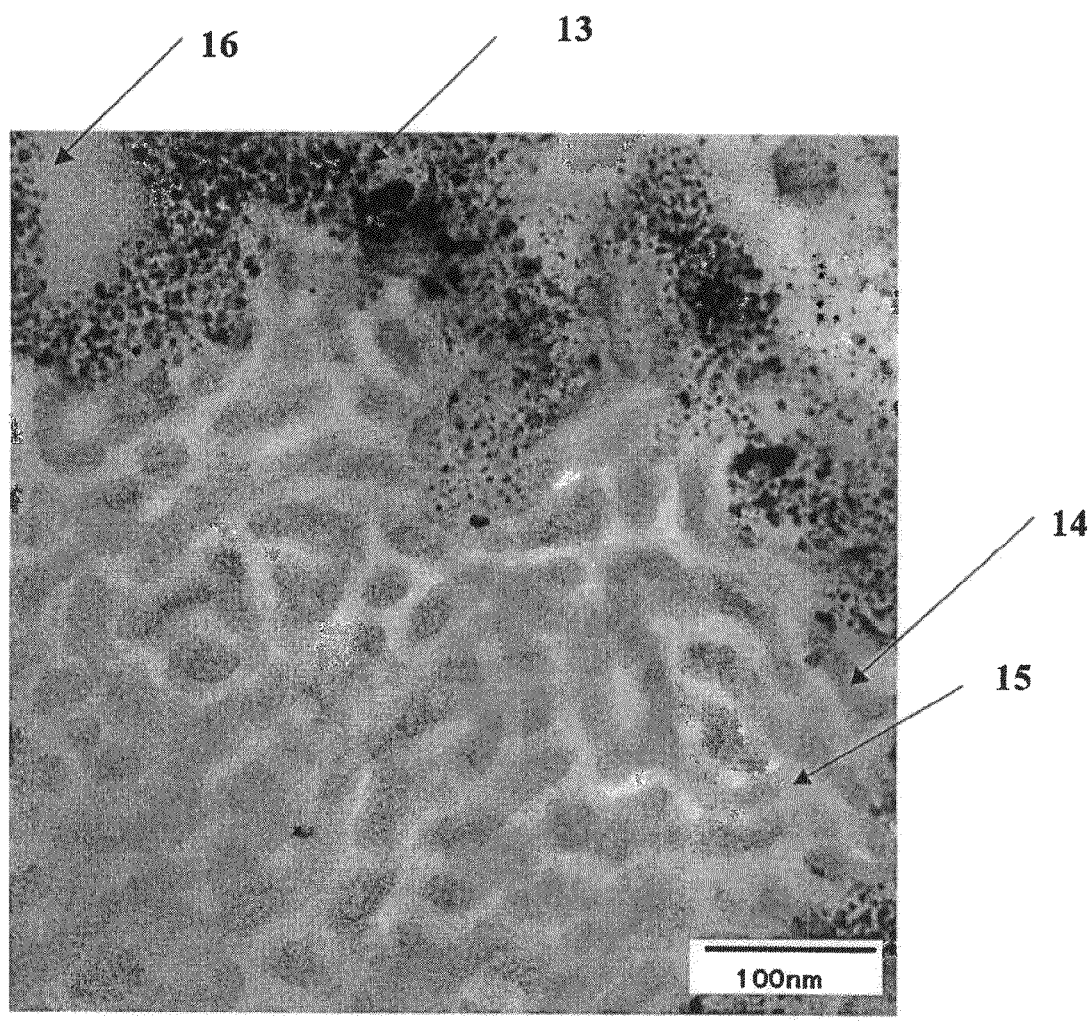
FIG. 4 is an electron microscope photograph of the catalyst layer of the anode for polymer electrolyte fuel cells obtained in Comparative example 1(1).
Figure 5:
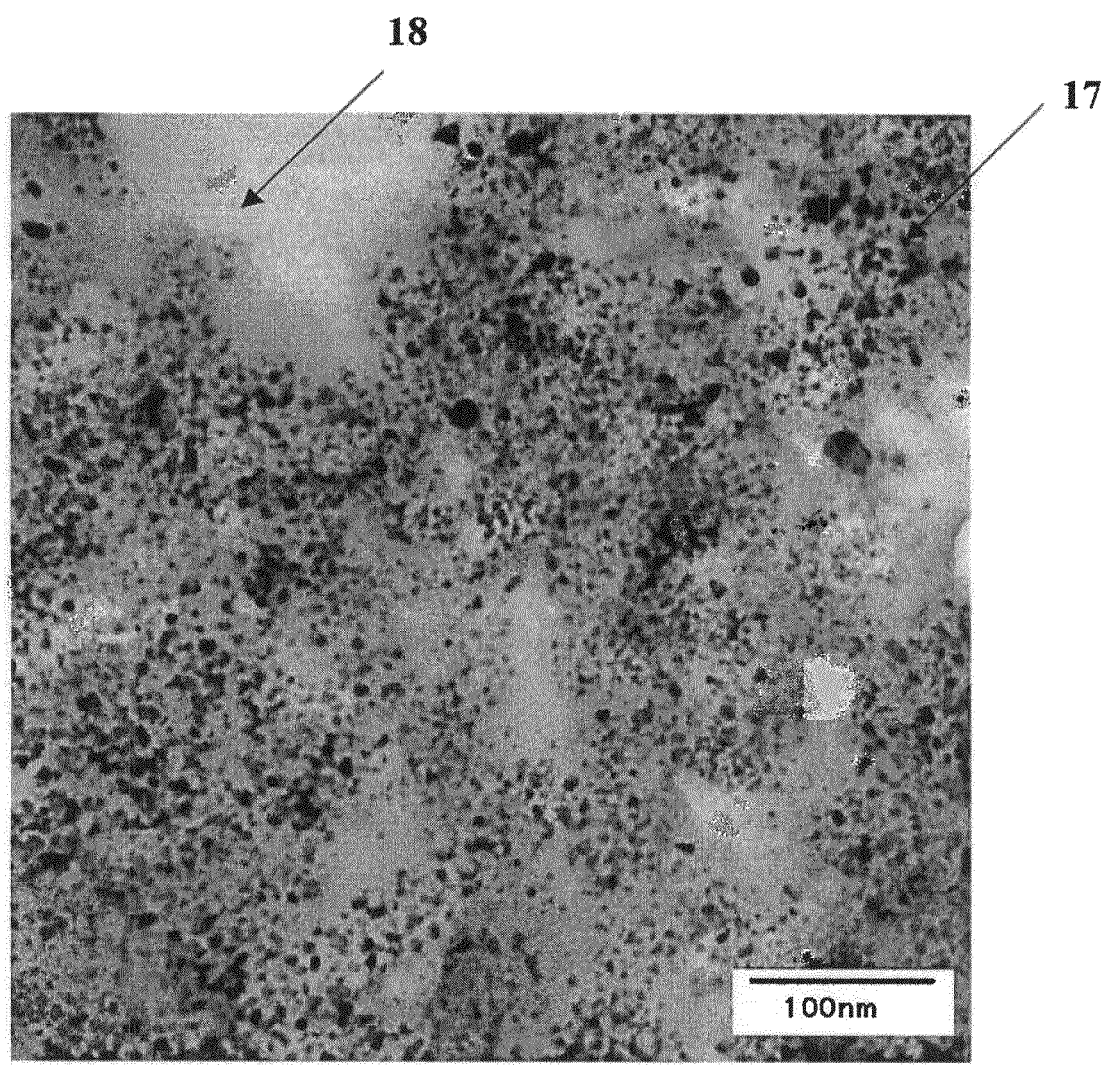
FIG. 5 is an electron microscope photograph of the catalyst layer of the anode for polymer electrolyte fuel cells obtained in Comparative example 2(1).
Figure 6:
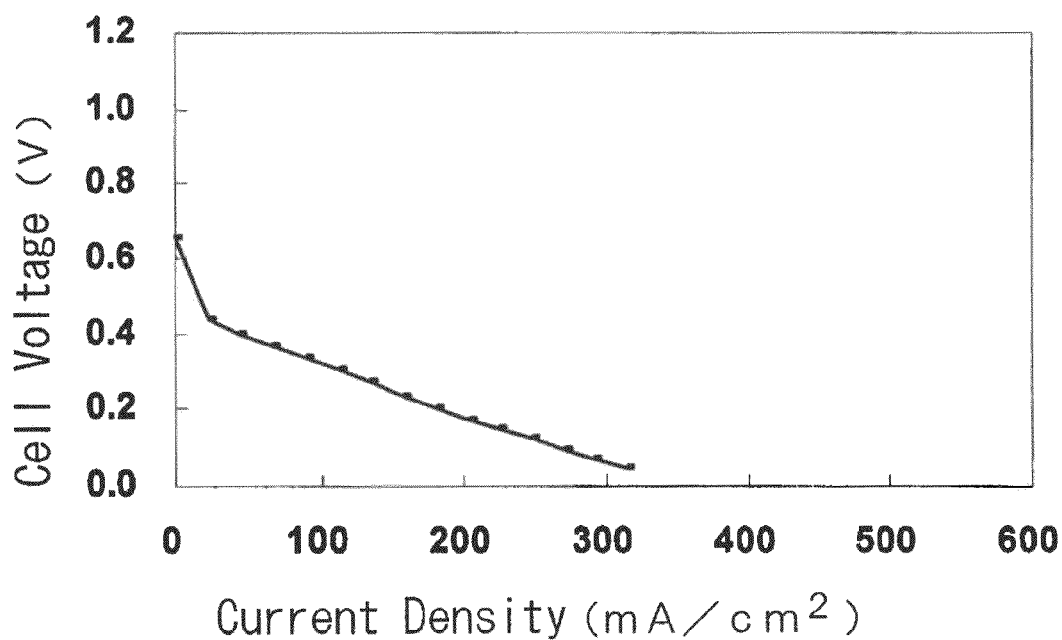
FIG. 6 is a drawing showing the electric current-voltage characteristic of the single cell for polymer electrolyte fuel cells using the membrane-electrode assembly obtained in Example 1(6).
Figure 7:
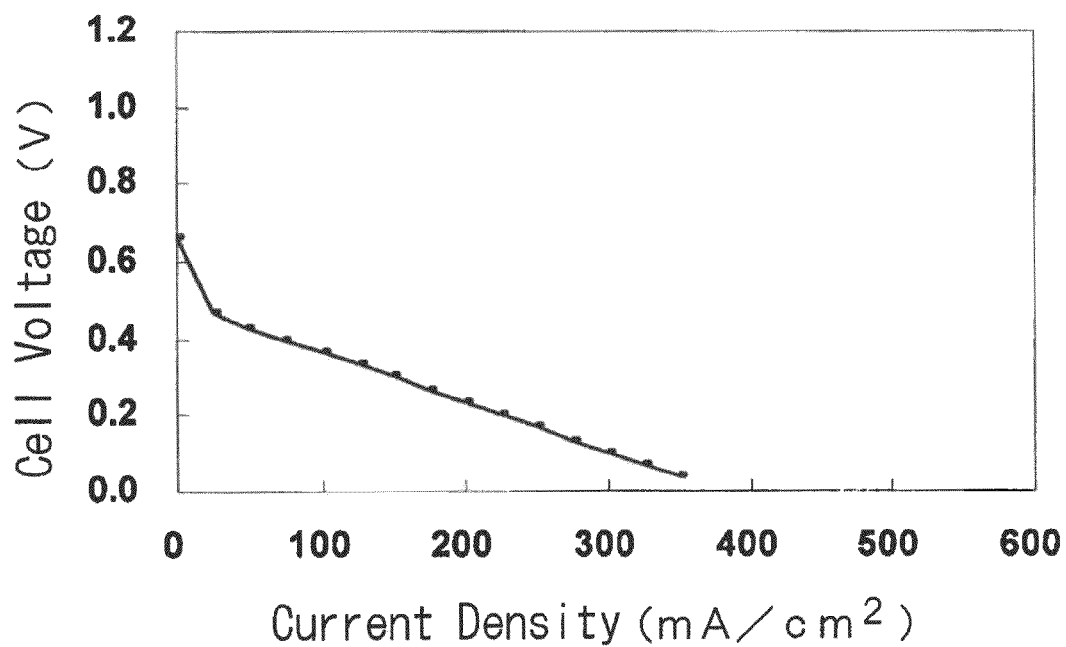
FIG. 7 is a drawing showing the electric current-voltage characteristic of the single cell for polymer electrolyte fuel cells using the membrane-electrode assembly obtained in Example 2(6).
Figure 8:
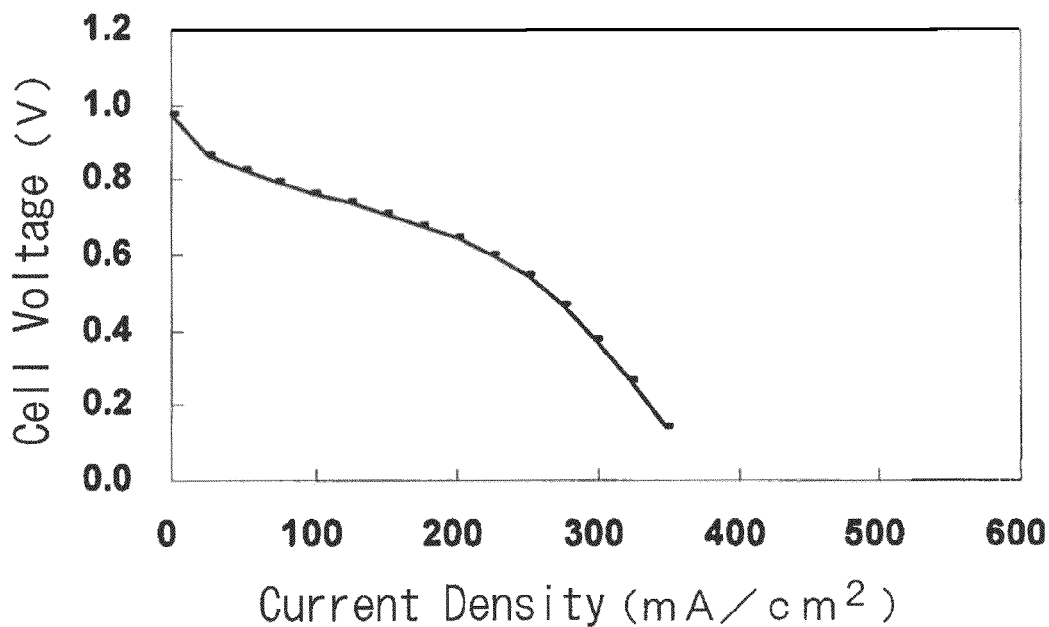
FIG. 8 is a drawing showing the electric current-voltage characteristic of the single cell for polymer electrolyte fuel cells using the membrane-electrode assembly obtained in Example 3(2).
Figure 9:
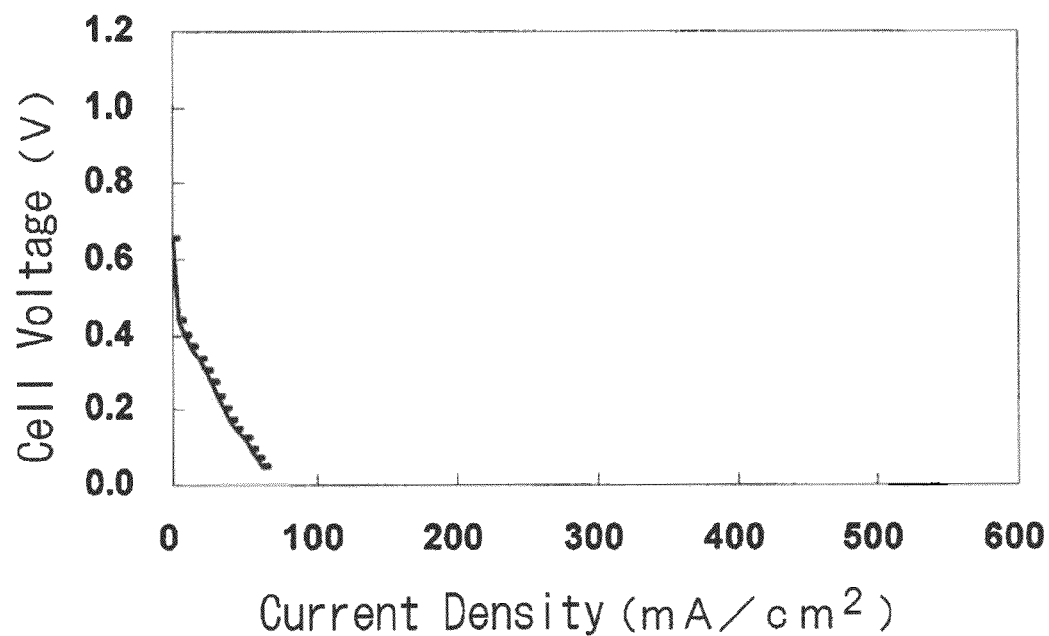
FIG. 9 is a drawing showing the electric current-voltage characteristic of the single cell for polymer electrolyte fuel cells using the membrane-electrode assembly obtained in Comparative example 1(2).
Figure 10:
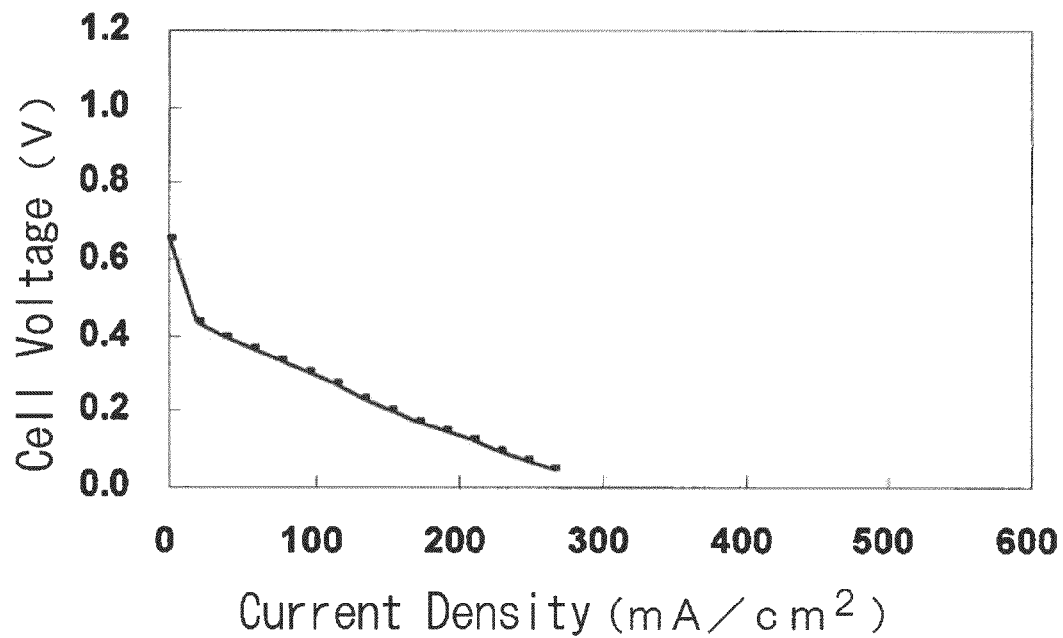
FIG. 10 is a drawing showing the electric current-voltage characteristic of the single cell for polymer electrolyte fuel cells using the membrane-electrode assembly obtained in Comparative example 2(2).
Figure 11:
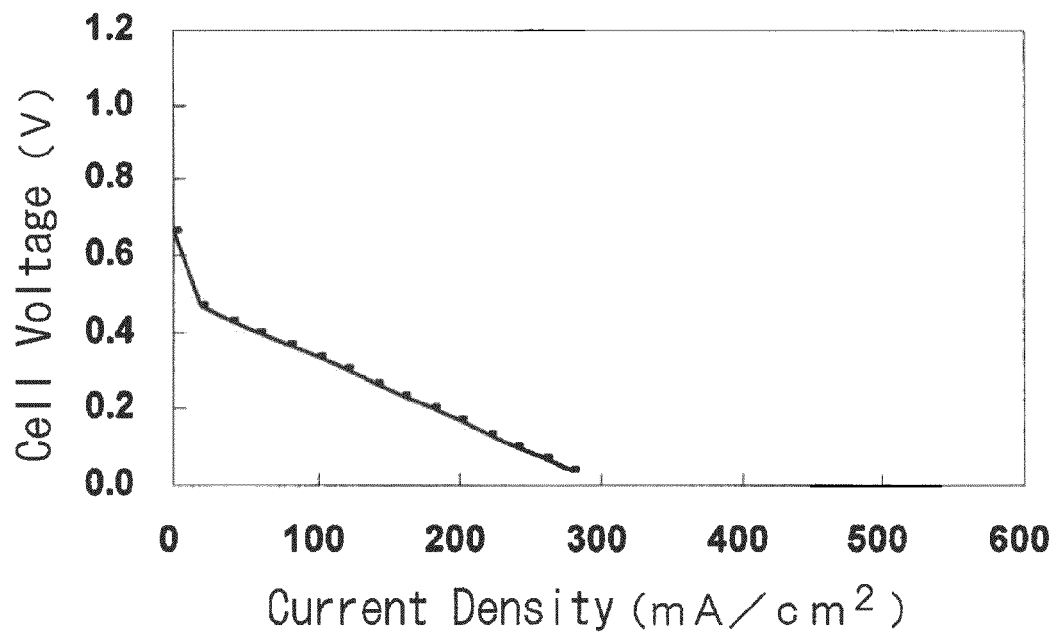
FIG. 11 is a drawing showing the electric current-voltage characteristic of the single cell for polymer electrolyte fuel cells using the membrane-electrode assembly obtained in Comparative example 3(2).
Figure 12:
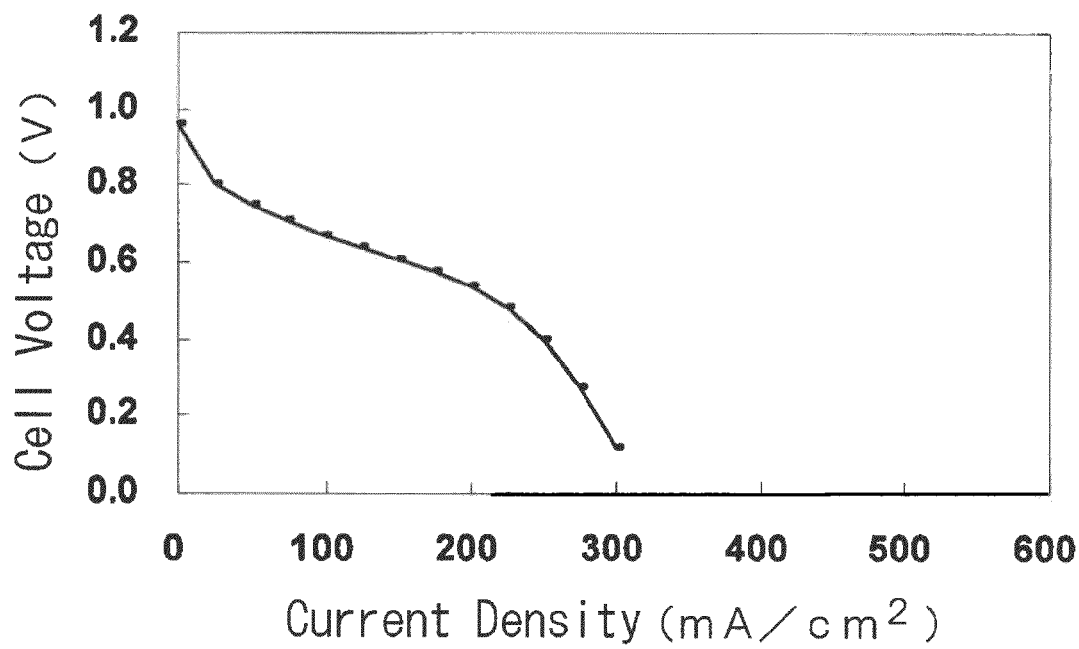
FIG. 12 is a drawing showing the electric current-voltage characteristic of the single cell for polymer electrolyte fuel cells using the membrane-electrode assembly obtained in Comparative example 4(2).
Figure 13:
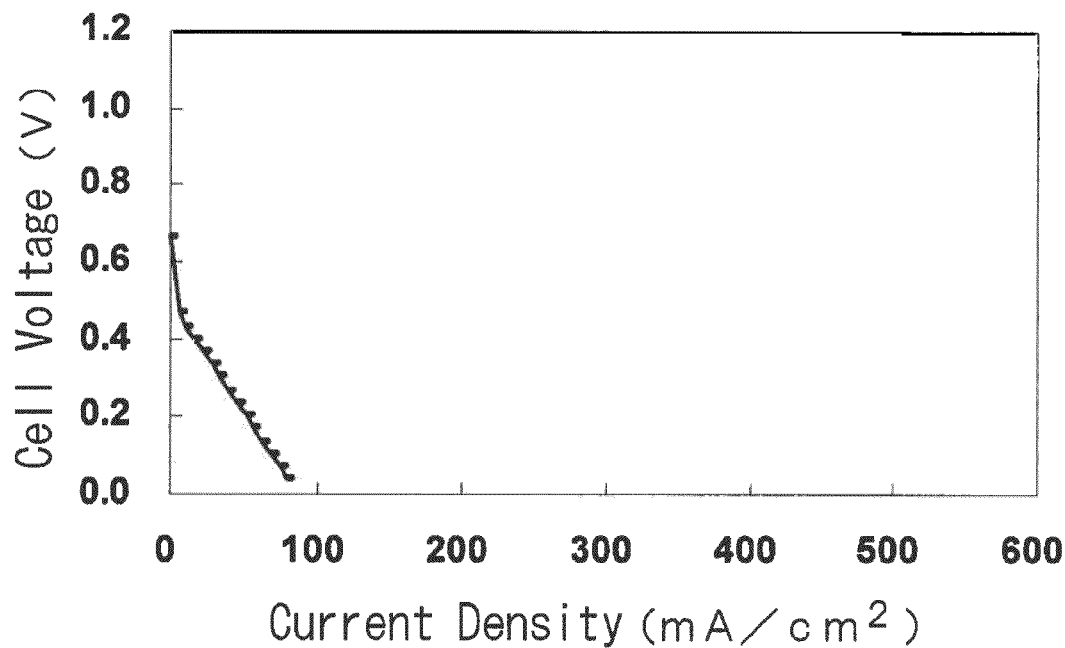
FIG. 13 is a drawing showing the electric current-voltage characteristic of the single cell for polymer electrolyte fuel cells using the membrane-electrode assembly obtained in Comparative example 5(3).

EXPLANATION OF LETTERS OR NUMERALS 1, 5, 9, 13 and 17 Catalyst particles
2, 6, 10 and 14 Polymer block (A) having ion-conductive groups
3, 7, 11 and 15 Polymer block (B) having no ion-conductive group
4, 8, 12, 16 and 18 Void

The invention claimed is:

1. A catalyst layer comprising catalyst particles and an ion-conductive binder, wherein:
   the ion-conductive binder mainly comprises a block copolymer having a particle size of 1 μm or less comprising a polymer block (A) having ion-conductive groups and a polymer block (B) having no ion-conductive group,
   both polymer blocks phase separate from each other,
   polymer block (A) forms a continuous phase, and
   the catalyst particles contact those parts of the block copolymer which comprise polymer block (A) having ion-conductive groups.

2. The catalyst layer according to claim 1, wherein a repeating unit of polymer block (A) is an aromatic vinyl compound unit.

3. The catalyst layer according to claim 2, wherein the aromatic vinyl compound is one of styrene, α-methylstyrene and styrene whose hydrogen atoms bonded to the benzene ring are replaced with 1 to 3 alkyl groups having 1 to 4 carbon atoms.

4. The catalyst layer according to claim 2, wherein said repeating unit is present in an amount of at least 80% by mass of polymer block (A).

5. The catalyst layer according to claim 2, wherein said repeating unit is present in an amount of at least 90% by mass of polymer block (A).

6. The catalyst layer according to claim 1, wherein the polymer block (B) comprises a polymer block (B1) which is a polymer block comprising as a repeating unit at least one unit selected from the group consisting of an alkene unit having 2 to 8 carbon atoms, a conjugated diene unit having 4 to 8 carbon atoms, and a conjugated diene unit having 4 to 8 carbon atoms in which unit part or all of carbon-carbon double bonds are hydrogenated.

7. The catalyst layer according to claim 6, wherein said repeating unit is present in an amount of at least 50% by mass of polymer block (B1).

8. The catalyst layer according to claim 6, wherein said repeating unit is present in an amount of at least 90% by mass of polymer block (B1).

9. The catalyst layer according to claim 6, wherein a mass ratio of polymer block (A) to polymer block (B1) is 95:5 to 5:95.

10. The catalyst layer according to claim 6, wherein a mass ratio of polymer block (A) to polymer block (B1) is 50:50 to 10:90.

11. The catalyst layer according to claim 1, wherein the polymer block (B) comprises a polymer block (B1) which is a polymer block comprising as a repeating unit at least one unit selected from the group consisting of an alkene unit having 2 to 8 carbon atoms, a conjugated diene unit having 4 to 8 carbon atoms, and a conjugated diene unit having 4 to 8 carbon atoms in which unit part or all of carbon-carbon double bonds are hydrogenated, and a polymer block (B2) which is a polymer block comprising as a repeating unit an aromatic vinyl compound unit and phase separates from the polymer block (A) and the polymer block (B1).

12. The catalyst layer according to claim 11, wherein the block copolymer has a structure wherein the polymer block (B1) is arranged in the center, the polymer blocks (B2) are arranged adjacently to each side thereof, respectively, and the polymer blocks (A) are arranged adjacently to each outer side of the polymer blocks (B2), respectively.

13. The catalyst layer according to claim 11, wherein said repeating unit of polymer block (B2) is present in an amount of less than 75% by mass of the block copolymer.

14. The catalyst layer according to claim 11, wherein said repeating unit of polymer block (B2) is present in an amount of less than 60% by mass of the block copolymer.

15. The catalyst layer according to claim 1, wherein the ion-conductive group is a cation-conductive group selected from the group consisting of a sulfonic acid group and a phosphonic acid group, and alkali metal salts and ammonium salts of them.

16. The catalyst layer according to claim 1, wherein 1 to 90% of the space among the catalyst particles is a void.

17. The catalyst layer according to claim 1, wherein the block copolymer has a core-shell structure wherein the inner layer is polymer block (B) and the outer layer is polymer block (A).

18. A process for preparation of the catalyst layer according to claim 1, comprising
   mixing a dispersion with catalyst particles and an optional water repellent, wherein the block copolymer and an optional additive are dispersed in an aqueous dispersion medium so that the particle size of the copolymer is 1 μm or less, and
   removing the aqueous dispersion medium.

19. A membrane-electrode assembly comprising the catalyst layer according to claim 1.

20. A polymer electrolyte fuel cell comprising the membrane-electrode assembly according to claim 19.

* * * * *